United States Patent
Takeda

(10) Patent No.: US 9,779,273 B2
(45) Date of Patent: Oct. 3, 2017

(54) MAGNETIC RECORDING MEDIUM PROCESSING DEVICE AND CONTROL METHOD OF THE SAME

(71) Applicant: NIDEC SANKYO CORPORATION, Suwa-gun, Nagano (JP)

(72) Inventor: Tomomi Takeda, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 15/023,219

(22) PCT Filed: Sep. 17, 2014

(86) PCT No.: PCT/JP2014/074528
§ 371 (c)(1),
(2) Date: Mar. 18, 2016

(87) PCT Pub. No.: WO2015/041237
PCT Pub. Date: Mar. 26, 2015

(65) Prior Publication Data
US 2016/0232385 A1  Aug. 11, 2016

(30) Foreign Application Priority Data
Sep. 18, 2013  (JP) ................. 2013-193477

(51) Int. Cl.
G07F 19/00  (2006.01)
G06K 7/08  (2006.01)
G06Q 20/10  (2012.01)

(52) U.S. Cl.
CPC ............ G06K 7/087 (2013.01); G06K 7/082 (2013.01); G06Q 20/1085 (2013.01); G07F 19/2055 (2013.01)

(58) Field of Classification Search
CPC . G06K 7/087; G06Q 20/1085; G07F 19/2055
See application file for complete search history.

(56) References Cited

U.S. PATENT DOCUMENTS 5,543,973 A * 8/1996 Moriyama ............. G11B 5/865
                                                  360/17
2007/0131768 A1* 6/2007 Wakabayashi ......... G06K 7/084
                                                  235/449

(Continued)

FOREIGN PATENT DOCUMENTS

JP  2001067524 A  3/2001
JP  2007164533 A  6/2007

(Continued)

OTHER PUBLICATIONS

International Search Report corresponding to Application No. PCT/JP2014/074528; Date of Mailing: Nov. 25, 2014, with English translation.

Primary Examiner — Sonji Johnson
(74) Attorney, Agent, or Firm — Cantor Colburn LLP

(57) ABSTRACT

A device comprising a detection mechanism to detect a medium; a pre-head to slide on a magnetic strip formed on the medium to read magnetic data; a shutter that opens and closes in response to the result of the detection mechanism; a card processor to process information recorded on the medium; and a magnetic field generating device which may include a magnetic field generator to generate a magnetic field by a resonance unit; and a drive control circuit to control driving of the magnetic field generator. The drive control circuit may include a power supply, a reference potential circuit, and a resonance drive circuit.

15 Claims, 14 Drawing Sheets

(56) References Cited

U.S. PATENT DOCUMENTS

2011/0006112 A1* 1/2011 Mueller ............... G06K 7/082
 235/379
2011/0135092 A1* 6/2011 Lehner ............... G06K 7/084
 380/252
2013/0141141 A1* 6/2013 Yesil ............... G07F 19/20
 327/110

FOREIGN PATENT DOCUMENTS

| JP | 2012118689 A | 6/2012 |
| WO | 2012085967 A1 | 6/2012 |

* cited by examiner

511 : RESONANCE UNIT
521 : DRIVE POWER SUPPLY UNIT
522 : REFERENCE POTENTIAL UNIT
ND51 : CONNECTION NODE
ND52 : FIRST NODE
ND53 : SECOND NODE
523 : RESONANCE DRIVE UNIT

MAGNETIC RECORDING MEDIUM PROCESSING DEVICE AND CONTROL METHOD OF THE SAME

CROSS REFERENCE TO RELATED APPLICATIONS

This is the U.S. national stage of application No. PCT/JP2014/074528, filed on Sep. 17, 2014. Priority under 35 U.S.C. §119(a) and 35 U.S.C. §365(b) is claimed from Japanese Applications No. 2013-193477, filed Sep. 18, 2013, the disclosure of which is incorporated herein by reference.

FIELD OF THE INVENTION

The present invention relates to a magnetic recording medium processing device which reads magnetic data recorded on a magnetic recording medium and writes magnetic data on a magnetic recording medium, and a control method of the same.

BACKGROUND

Conventionally, widely used is a card reader for a magnetic recording medium processing device which reads magnetic data recorded on a magnetic recording medium in a card form (hereinafter called "a card") and/or writes magnetic data on a card. A card reader of this kind is installed and used in a host device such as an ATM (Automated Teller Machine) which is set up at a financial institution such as a bank. In recent years, in the industry of the financial institution where card readers are used, a so-called "skimming", which means that a fraudster attaches a magnetic head to the front of a card insertion opening of a card reader to illegally acquire magnetic data of cards, has been a serious problem.

Therefore, a card reader equipped with a magnetic field generating device has been proposed, the magnetic generating field generating device generating a disturbing magnetic field to disturb the reading of magnetic data on cards by a skimming magnetic head attached to the front of a card insertion opening (Patent reference 1, for example). The card reader disclosed in Patent reference 1 is equipped with a magnetic field (magnetism) generating device which is mounted at a card insertion opening of the card reader and has a technology to disturb the skimming magnetic head from reading magnetic data of a card user with a disturbing magnetic field released from the magnetic field (magnetism) generating device.

In this technology, a circuit that generates a disturbing magnetic field has adopted the configuration to turn on the power source of a coil (an inductor) with a transistor having a switching function.

In the card reader disclosed in Patent reference 1, the above-mentioned magnetic field (magnetism) generating device is applied in the following manner. A fraudster attaches a skimming magnetic head, which is a magnetic head, and a magnetic reading circuit at the card insertion opening of a card reader to read magnetic data on cards. To prevent the skimming magnetic head from reading magnetic data, a disturbing magnetic field is generated toward the skimming magnetic head.

PATENT REFERENCE

[Patent Reference 1] Unexamined Japanese Patent Application Publication 2001-67524 (Alternatively, Patent No. 3936496)

However, in the magnetic field generating device disclosed in Patent reference 1, the circuit drives the power source of the coil (the inductor) with the transistor having a switching function; therefore, the magnetic field is generated on an on-off basis with shorter disturbing time or a weak magnetic field, making it difficult to prevent the illegal reading by the skimming magnetic head with certainty. When the magnetic field of the magnetic field generating device is intensified, even if the driving of the magnetic field generation is stopped, the residual magnetic field may affect the actual reading of magnetic data by a legal card reader.

SUMMARY

Therefore, at least an embodiment of the present invention provides a magnetic recording medium processing device in which the influence on the magnetic data reading is reduced and also illegal acquisition of magnetic data is prevented, and a control method of the magnetic recording medium processing device.

A magnetic recording medium processing device may include a detection mechanism portion for detecting a magnetic recording medium in a card form which is inserted into or discharged from an insertion opening, a pre-head for reading magnetic data by sliding on a magnetic strip formed on the magnetic recording medium in a card form, a shutter which is opened or closed according to the detection result by the detection mechanism portion, a card processing portion for processing magnetic information recorded on the magnetic recording medium in a card form, and a magnetism generating device which has a magnetic field generating unit for generating a magnetic field at a resonance unit and a drive control circuit for controlling the magnetic field generating unit; wherein the drive control circuit of the magnetism generating device includes a drive power supply unit for supplying dive voltage, a reference potential unit, and a resonance drive unit for driving the resonance unit; the resonance unit contains a resonance circuit in which an inductor and a capacitor are connected between a first node and a second node, receives the drive voltage at the first node, resonates under the condition where the second node is connected to the reference potential unit, and generates a magnetic field; the resonance drive circuit comprises a drive switching element which is connected between the second node at the resonance unit and the reference potential unit and is to be switched between the conducting state and the non-conducting state according to the control signal to switch the connection status between the second node at the resonance unit and the reference potential unit between the connected state and the disconnected state. This makes it possible to reduce the [bad] influence on the magnetic data reading by the magnetic recording medium processing device and also to prevent illegal acquisition of the magnetic data with certainty.

It is preferred that the drive control circuit have a discharge drive unit including a first switching element, which is connected between the first node at the resonance unit and the discharge potential unit and is to be switched between the conducting state and the non-conducting state responding to the magnetic field generation halt signal to switch the connection status between the first node at the resonance unit and the discharge potential unit between connected state and the disconnected state, and also switches the first switching element to the conducting state at the time of halting the magnetic field generation. This makes it possible not only to increase the output of the disturbing magnetic field, but also to prevent the pre-head of the magnetic recording medium processing device from a false detection of a magnetic field, to have the shutter to open/close responsively, and to prevent a card from hitting (colliding with) the shutter even when the card is inserted quickly.

The drive control circuit may be configured to have the discharge drive unit including a first switching element, which is connected between the first node at the resonance unit and the discharge potential unit and is to be switched between the conducting state and the non-conducting state responding to the first magnetic field generation halt signal to switch the connection status between the first node at the resonance unit and the discharge potential unit between the connected state and the disconnected state, and that the drive power supply unit may be configured to include a second switching element, which is connected between a supply unit of the drive voltage and the first node at the resonance unit and is to be switched between the conducting state and the non-conducting state responding to the second magnetic field generation halt signal to switch the connection status between the supply unit of the drive voltage and the first node at the resonance unit between the connected state and the disconnected state.

It is also preferred that the drive control circuit first switch the second switching element at the drive power supply unit to the non-conducting state and then switch the first switching element at the discharge drive unit to the conducting state at the time of halting the magnetic field generation. It is also preferred that the drive control circuit first switch the first switching element at the discharge drive unit to the non-conducting state and then switch the second switching element at the drive power supply unit to the conducting state at the start of the magnetic field generation. Even in this case, not only can the output of the disturbing magnetic field be increased, but also a false detection of a magnetic field by the pre-head of the magnetic recording medium processing device can be prevented, the shutter can be opened/closed responsively, and a card is prevented from hitting (colliding with) the shutter even when the card is inserted quickly.

It is preferred that the resonance drive unit drive the resonance unit such that the connection status between the second node at the resonance unit and the reference potential unit is periodically and/or periodically switched between the connected and disconnected states and therefore, resonance is periodically and/or periodically induced to periodically and/or periodically generate a magnetic field. With this, a strong magnetic field is continuously generated for a predetermined period of time; as a result, the output of the disturbing magnetic field can be increased to prevent illegal acquisition of magnetic data with certainty.

It is preferred that a control unit be provided for drive-controlling the magnetic field generating device according to the detection result by the detection mechanism unit and the detection information obtained by the pre-head, and that the control unit controls the magnetic field generating device to stop the generation of the magnetic field when a recording medium is detected by the pre-head and to resume the generation of the magnetic field when magnetic information is detected by the pre-head. It is also preferred that, after magnetic information is detected by the pre-head and the generation of the magnetic field is resumed in the magnetic field generating device, the control unit opens the shutter to take the magnetic recording medium in. Even in this case, not only can the output of the disturbing magnetic field increased, but also a false detection of the magnetic field by the pre-head of the magnetic recording medium processing device can be prevented, the shutter can be opened/closed responsively, and a card is prevented from hitting (colliding with) the shutter even when the card is inserted quickly In a magnetic recording medium processing device which comprises a detection mechanism portion for detecting a card-type magnetic recording medium inserted into or discharged from an insertion opening, a pre-head for reading magnetic data by sliding on a magnetic strip formed on the card-type magnetic recording medium, a shutter which is opened or closed according to the detection result by the detection mechanism section, a card processing portion for processing the magnetic information recorded on the card-type magnetic recording medium, and a magnetism generating device having a magnetic field generating portion for generating the magnetic field by a resonance unit containing a resonance circuit, in which an inductor and a capacitor are connected between a first node and a second node, and a drive control circuit for driving the magnetic field generating portion, wherein the drive control circuit of the magnetism generating device includes a drive power supply unit for supplying a drive voltage, a reference potential unit, a resonance drive unit containing a drive switching element which is connected between the second node at the resonance unit and the reference potential unit and is to be switched between the conducting state and the non-conducting state according to the control signal to switch the connection status between the second node at the resonance unit and the reference potential unit between the connected state and the disconnected state, a control method for a magnetic recording medium processing device switches the first switching element to the conducting state at the time of halting the magnetic field generation. It is preferred that, when controlling the magnetic field generation halt in the magnetic recording medium processing device containing a second switching element which is connected between the supply source of the drive voltage and the first node at the resonance unit and is to be switched between the conducting state and the non-conducting state according to the second magnetic field generation halt signal to switch the connection status between the supply source of the drive voltage and the first node at the resonance unit between the connected state and the disconnected state, the drive power supply unit switches the first switching element at the discharge drive unit to the non-conducting state and then switches the second switching element at the drive power supply unit to the conducting state at the time of generating a magnetic field, and switches the first switching element at the discharge drive unit to the conducting state and then the second switching element to the non-conducting state at the time of halting the magnetic field generation. This can reduce the [bad] influence on the reading of magnetic data by the magnetic recording medium processing device and also prevent the illegal acquisition of magnetic data with certainty.

EFFECTS OF THE INVENTION

According to the at least an embodiment, the influence on the reading of magnetic data by a magnetic recording medium processing device can be reduced and illegal acquisition of magnetic data can be prevented with certainty.

BRIEF DESCRIPTION OF DRAWING

Embodiments will now be described, by way of example only, with reference to the accompanying drawings which are meant to be exemplary, not limiting, and wherein like elements are numbered alike in several Figures, in which:

FIG. 12 A flowchart to explain the operation of the magnetic recording medium processing device when taking a card in.

FIG. 13 A diagram to explain the operation [of the magnetic recording medium processing device] when taking a card in.

DETAILED DESCRIPTION

The embodiment of the present invention is described hereinafter associated with the drawings.

This embodiment is explained using a card reader as an example of a magnetic recording medium processing device which reads magnetic data recorded on card-type recording media or records magnetic data.

The configuration of a card reader of this embodiment is first described, and then the detailed circuit configuration and the operation of a magnetic field generating device which generates a disturbing magnetic field. Then, the operations by the card reader to take a card in and discharge the card are described associated with the drive timing of the magnetic field generating device.

[Configuration of Card Reader]

Figure 1:
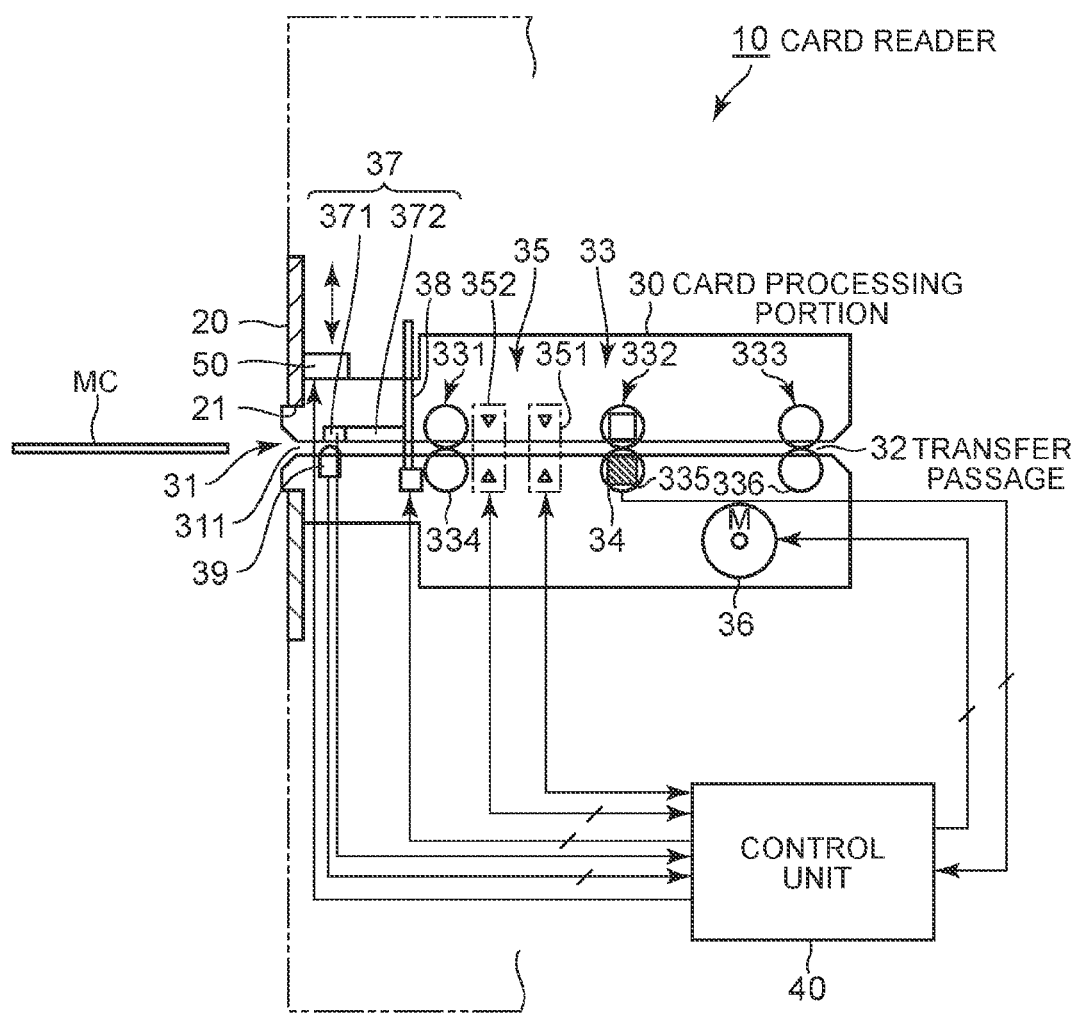
FIG. 1 A diagram showing the configuration of a major part of a card reader which is a magnetic recording medium processing device of an embodiment of the present invention.

FIG. 1 is a diagram of the configuration of a major portion of a card reader which is a magnetic recording medium processing device of the embodiment of the present invention.

Figure 2:
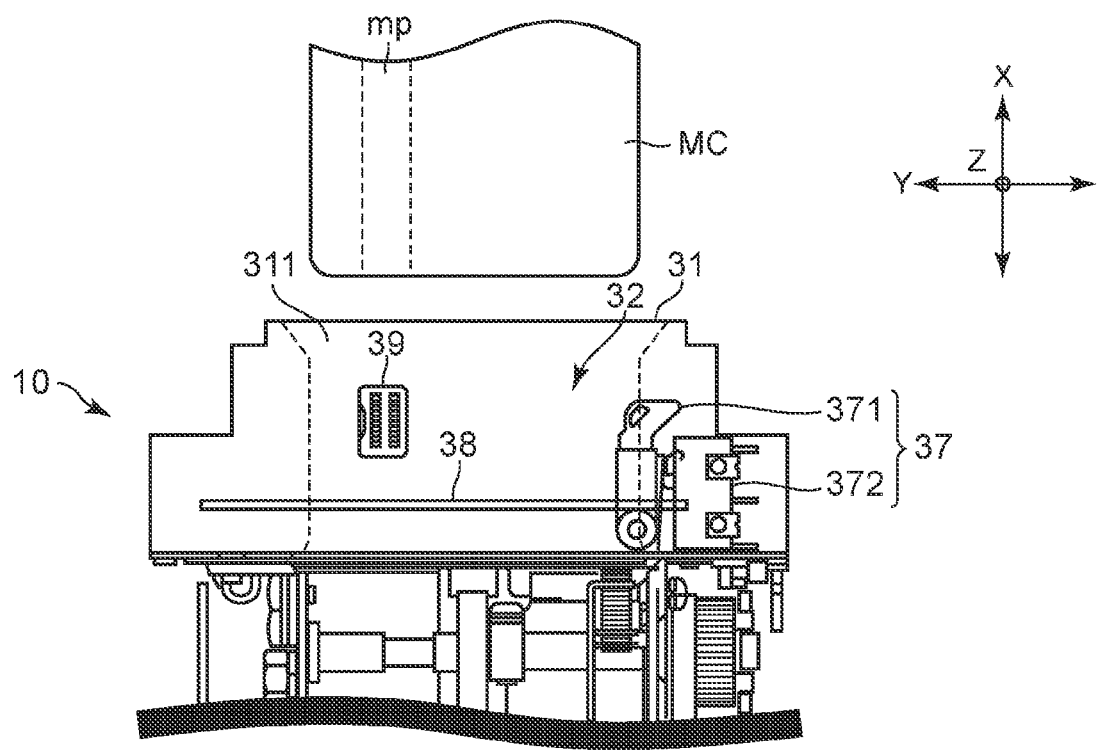
FIG. 2 A diagram showing the configuration of a card insertion opening of the card reader which is a magnetic recording medium processing device of this embodiment.

FIG. 2 is a diagram of the configuration of a card insertion opening of the card reader which is the magnetic recording medium processing device of this embodiment.

A card reader 10 of this embodiment is a magnetic recording medium processing device for reading magnetic data recorded on a card MC and/or writing magnetic data on a card MC, and is mounted in a predetermined host device such as an automated teller machine (ATM) set up at a financial institution, for example. The card reader 10 is positioned deep inside of a front panel 20 which configures the front face of the case of the host device. In the front panel 20, an opening 21 is formed to have a card MC, as a magnetic recording medium on which magnetic data is recorded, inserted or discharged.

As shown in FIG. 1, the card reader 10 is provided with a card processing portion 30 for reading magnetic data recorded on a card MC and/or for writing magnetic data on a card MC, a card insertion portion 31 at which a card insertion opening 311 is formed for inserting and discharging the card MC, a control unit 40 for controlling the card reader 10, and a magnetic field generating device 50 which generates a disturbing magnetic field to prevent the reading of the magnetic data of the card MC by a skimming magnetic head. Formed inside the card reader 10 is a card transferring passage 32 in which a card MC inserted from the card insertion opening 311 is transferred. Also, the control unit 40 for performing various controls in the card reader 10 is actually mounted on a circuit board (no illustration).

In this embodiment, a card MC is carried in the X direction (the left-right direction) shown in FIG. 1 and FIG. 2. In other words, the X direction is a card MC-carrying direction. Also, the Z direction (the top-bottom direction) shown in FIG. 1 is the card MC's thickness direction; the Y direction shown in FIG. 1 and FIG. 2 (the perpendicular direction on paper in FIG. 1), orthogonal to the X direction and the Z direction, is the card MC's width direction (the short-side direction).

The card MC is a rectangular card made from polyvinyl chloride, having a thickness of about 0.7 to 0.8 mm, for example. On this card MC, a magnetic strip mp is formed. Note that an IC chip may be secured on the card MC or a communication antenna may be built in the card. Also, the card MC may be a PET (polyethylene terephthalate) card having a thickness of about 0.18 to 0.36 mm, or a paper card having a predetermined thickness.

The card processing portion 30 is equipped with a card transfer mechanism 33 for transferring the card MC with the card transferring passage 32, a magnetic head 34 for reading and writing magnetic data, and a photo sensor 35 for detecting the presence of the card MC in the card transferring passage 32.

The card transfer mechanism 33 is equipped with three transferring rollers 331 through 333, a driving motor 36 for driving the transferring rollers 331 through 333, and a power transmitting mechanism (no illustration) for transmitting the power force of the driving motor 36 to the transferring rollers 331 through 333. The card transfer mechanism 33 is equipped with pad rollers 334 through 336 which are respectively arranged opposite the transferring rollers 331 through 333 and are energized toward the transferring rollers 331 through 333. The three transferring rollers 331 through 333 are spaced at a predetermined distance in the card MC's transfer direction.

Each of the transferring rollers 331, 332 and 333 is driven by the driving motor 36 under the control of the control unit 40.

The magnetic head 34, as shown in FIG. 1, is arranged such that the center of rotation of the transferring roller 332 arranged in the center of the card processing portion 30 agrees with the center of the magnetic heard 34 in the X direction. Also, a counter roller 335 is opposed to the magnetic head 34 to apply energizing force, which is toward the magnetic head 34, to the card MC passing in the card transferring passage 32.

The photo sensor 35 is an optical sensor having a light-emitting device and a light-receiving device.

In this embodiment, the magnetic head 34 reads magnetic data recorded on the magnetic strip mp immediately after the leading edge of the card MC is detected by the photo sensor 351 and finishes reading the magnetic data right before the card MC is mp longer detected by the photo sensor 351. In other words, the photo sensor 351 can detect whether or not the magnetic head 34 is reading magnetic data.

The card insertion portion 31 is provided with a card insertion detecting mechanism 37 as a detecting mechanism portion for detecting whether or not a card MC is inserted from the card insertion opening 311, a shutter 38 which opens/closes the card transferring passage 32, and a pre-head (a magnetic head) for reading magnetic data recorded on the magnetic strip mp.

The card insertion detecting mechanism 37, as shown in FIG. 2, for example, is equipped with a card width sensor (a card detecting sensor) 372 for detecting if a sensor lever 371, which is capable of abutting on one of the edges in the width direction of the card MC, is abutting on the card MC. Note that the sensor lever 371 is rotatable around a predetermined rotation axis and capable of entering the card transferring passage 32.

The card width sensor 372 is configured by a contact switch having a lever member and a contact which is to be pressed by the lever member. In this embodiment, when the edge portion of the card MC in the width direction, which is inserted from the card insertion opening 311, makes contact with the sensor lever 371, the sensor lever 371 is revolved and makes contact with the lever member of the card width sensor 372, and then the contact is pressed by the lever member. In other words, the card width sensor 372 of this embodiment detects that the card MC has been inserted from the card insertion opening 311 by detecting that the card MC inserted from the card insertion opening 311 has made a contact with the sensor lever 371.

Note that the card width sensor 372 may be an optical sensor having a light-emitting device and a light-receiving device. Also, the card insertion detecting mechanism 37 may be a mechanical detecting mechanism having a contact which directly makes contact with the edge portion of a card MC in the width direction.

The pre-head 39 is arranged in the vicinity of the card insertion opening 311 in the card MC transferring direction. More specifically described, the pre-head 39 is arranged in the vicinity of the card insertion detecting mechanism 37, that is, in the vicinity of the contact portion of the sensor lever 371 with a card MC, for example. In this embodiment, the pre-head 39 reads magnetic data recorded on the magnetic strip mp immediately after the leading edge of the card MC is detected by the card insertion detecting mechanism 37, and ends the magnetic data reading right before the card insertion detecting mechanism 37 no longer detects the card MC. In other words, in this embodiment, the card insertion detecting mechanism 37 can detect whether or not the pre-head 39 is reading magnetic data. The card insertion detecting mechanism 37 of this embodiment functions as a reading status detecting means for detecting that the magnetic data reading is being performed by the pre-head 39.

Note that the magnetic field generating device 50 includes a resonance unit (a resonance circuit) as the magnetic field generating unit, and has a feature in the configuration of its drive control circuit; its configuration is described in detail later, using the example of multiple embodiments.

[Configuration of Control Unit of Card Reader]

Figure 3:
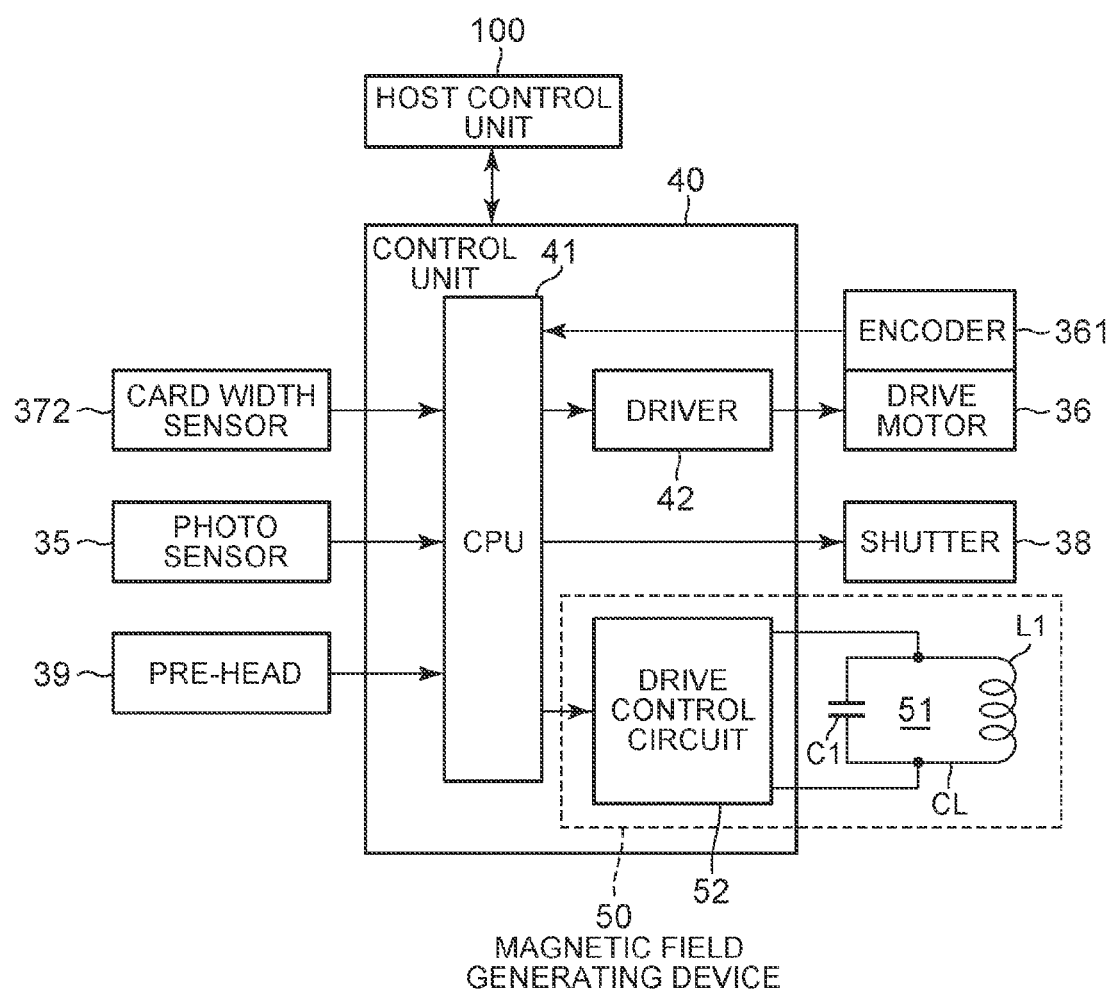
FIG. 3 A first block diagram showing the configuration of a control unit and its related portions of the card reader shown in FIG. 1.
Figure 4:
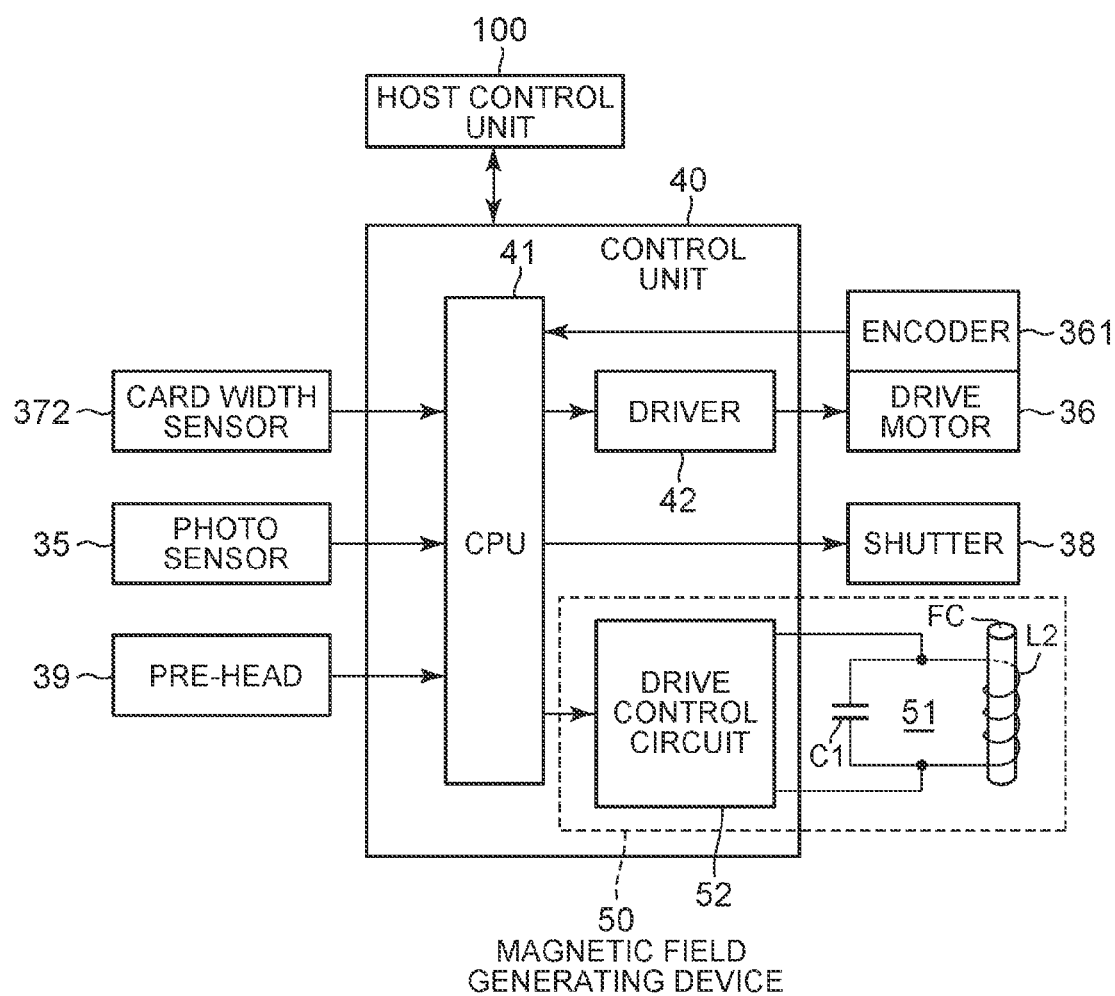
FIG. 4 A second block diagram showing the configuration of a control unit and its related portions of the card reader shown in FIG. 1.

FIG. 3 is a first block diagram showing the configuration of the control unit 40 and its related portions of the card reader 10 shown in FIG. 1. FIG. 4 is a second block diagram showing the configuration of the control unit 40 and its related portions of the card reader 10 shown in FIG. 1. FIG. 3 and FIG. 4 also show the configuration example of an inductor and a capacitor of the magnetic generating device which generates a disturbing magnetic field.

The control unit 40 is mounted on a circuit board (no illustration). The control unit 40 performs various controls on the various sections of the card reader 10, and is configured to include a CPU 41, for example. The control unit 40 controls the operation of transferring a card MC, the operation of reading by the magnetic head 34, etc., according to the control program stored in the built-in ROM. Further, the photo sensor 35, the card detecting sensor 372 and the pre-head are connected to the control unit 40 to which the output signals from each of those configurations are input. Also, a drive motor 36 is connected to the control unit 40 via a driver 42. Also, an encoder 361 is connected to the control unit 40 so that the output signals from the encoder 361, which detects the rotation condition of the motor 36, are input to the control unit 40.

In this embodiment, connected also to the control unit 40 is the magnetic field generating device 50 which generates a disturbing magnetic field toward a skimming magnetic head which is illegally installed. The magnetic field generating device 50 is controlled to generate a magnetic field or stop generating the magnetic field according to the card detection result by the card detecting sensor 372 and the magnetic detection result by the pre-head 39.

[Configuration of Magnetic Field Generating Device]

The magnetic field generating device 50 of this embodiment has a magnetic generating unit 51 and a drive control circuit (a drive control unit) 52 for controlling the magnetic field generation by the magnetic field generating unit and the halt of the magnetic field generating unit.

The magnetic field generating unit 51 of the magnetic field generating device 50 is configured to include an inductor L1 for generating a magnetic field. The inductor L1 is formed by a coil CL, as shown in FIG. 3. Alternatively, an inductor L2 is formed by winding a coil CL around an iron core FC, as shown in FIG. 4. In this embodiment, the magnetic field generating unit 51 is arranged in the card insertion portion 31. In the magnetic field generating unit 51 of the interfering magnetic field generating device 50 of this embodiment, the inductor L1 or L2 is connected to the capacitor C1 or C2 to configure a resonance unit (a parallel resonance circuit) so that compared to the configuration with only an inductor, the disturbing magnetic field is continuously generated and the output of the disturbing magnetic field is increased.

In the magnetic field generating device 50, alternating current or direct current is applied to the coil CL under the control of the drive control circuit 52 which is comprehensively controlled by the control unit 40. [The magnetic field generating device 50] is configured and positioned so that, as current applied, a disturbing magnetic field is generated outside the opening 21 or the card insertion unit 31. [The magnetic field generating device 50] is configured such that the area over which the disturbing magnetic field is generated includes the area in which the magnetic strip mp formed on a magnetic card MC, which is inserted or discharged through the card insertion unit 31, passes.

The magnetic field generating device 50 configured as above can be arranged in the vicinity to the inside (the back side) of the front panel 20 as shown in FIG. 1, including the magnetic field generating unit 51 and the drive control circuit 52 together. Note that various configurations are possible, such as arranging only the resonance unit for the magnetic field generating unit, which is configured by the coil (the inductor) L51 and the capacitor C51, for example, in the vicinity of the inside of the front panel 20.

Figure 5:
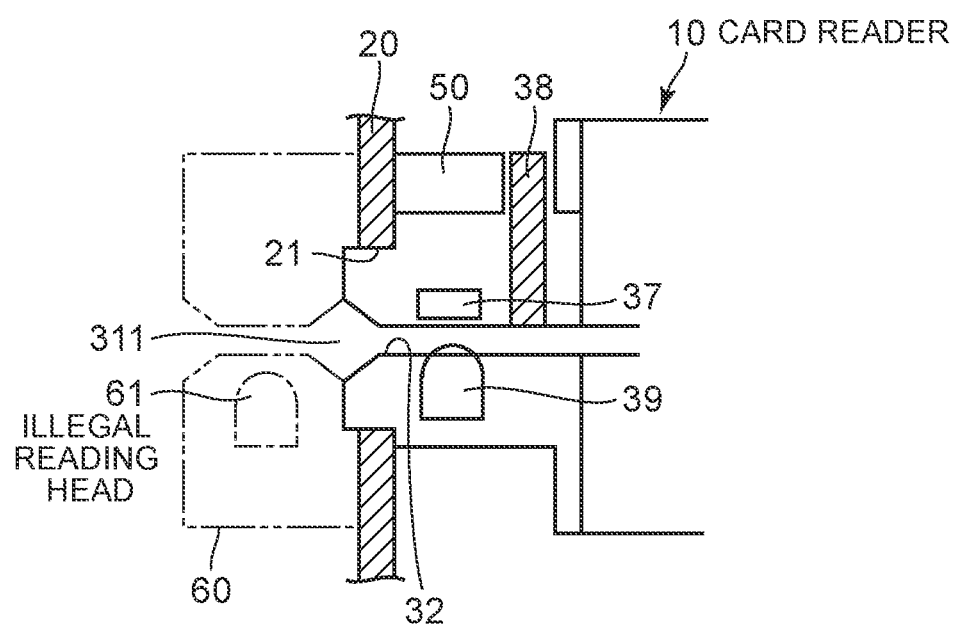
FIG. 5 A schematic diagram of a skimming magnetic head device attached to the outside of the device.

FIG. 5 is a schematic diagram in which (a skimmer including) a skimming magnetic head is attached to the outside of the device.

In the card reader 10, as soon as the leading edge of a card MC is inserted in the card insertion opening 311, the card MC is transferred at a predetermined speed by the transfer roller 311. In the same manner, at the discharge of the magnetic card MC, the magnetic card MC is transferred at a predetermined speed by the transfer roller 331 until substantially discharged to the outside.

Therefore, when a skimmer (a reading device that reads data on magnetic cards illegally) including a skimming magnetic head and a magnetic reading circuit is attached outside the card insertion opening 311, a card is transferred at a predetermined speed along the skimming magnetic head. Therefore, card recording data can be read by such an [illegal] magnetic head attached outside the card opening.

In the card reader 10 of this embodiment, even if a skimmer 60 including a magnetic head 61 is illegally mounted on the front surface of the front panel 20 in which a card slot opening 21 is formed, as shown in FIG. 5, the [illegal] operation of reading a card MC by such a skimming magnetic head 61 can be prevented by the disturbing magnetic field generated by the magnetic field generating device 50.

In other words, this embodiment has adopted the magnetic field generating device 50 having the configuration with the following feature, which is capable of continuously generating the disturbing magnetic field to prevent magnetic data from being illegally acquired with certainty.

[Configuration Example of Magnetic Field Generating Unit (Resonance Unit) and Drive Control Unit 52 of Magnetic Field Generating Device 50]

A more concrete circuit configuration and operation of the magnetic field generating unit 51 and the drive control circuit 52 of the magnetic field generating device 50 are described in detail in the multiple (the first to the third) embodiments. In the description below, a resonance unit 511 as the magnetic field generating unit 51 of the magnetic field generating device 50 of the first embodiment has an LC parallel resonance circuit formed by connecting the coil L, which is an inductor, with the capacitor C, and functions to continuously generate a magnetic field by the LC parallel resonance circuit. Further, in this embodiment, this magnetic field generating unit 51 has a function to generate a stronger magnetic field than the conventional one. With this, the magnetic field generating device 50 continuously generates magnetic field over a predetermined period of time; as a result, the output of the disturbing magnetic field is increased, preventing illegal acquisition of magnetic data which is done by using a skimming magnetic head.

Note that since the output of the disturbing magnetic field is increased in the magnetic field generating device 50 as described above, even when the drive control is stopped, the strong magnetic field remains; in other words, the residual magnetic field accompanying the residual resonance energy may prevent the pre-head 39 from reading magnetic data. In the card reader 10, the shutter 38 is normally closed to prevent foreign matter from entering, but the shutter 38 is opened, based on the output signal of the magnetic data from the pre-head 39; however, the pre-head 39 may not be able to read magnetic data or the pre-head 39 may make a false detection [of magnetic data] due to the residual magnetic field. Therefore, the shutter 38 presents a poor response to the open/close control, which may in turn cause a card MC to hit (collide with) the shutter 38 when a user inserts the card quickly. To solve the above problems, in the card reader 10, [the shutter 38] and the pre-head 39 are spaced from each other in the card transfer direction at a distance within which the resonance energy attenuates and therefore won't affect the magnetic head. Alternatively, the output of the resonance energy may be set so as to attenuate. Alternatively, the car transfer passage 32 may be configured to receive stress when a card is transferred, so that the card may take longer time reach the shutter 38.

A magnetic field generating device 50B of the second embodiment is configured having a function to quickly (immediately) release the resonance energy at the LC resonance circuit, which generates a disturbing magnetic field, of the first embodiment when halting the generation of the disturbing magnetic field. This magnetic field generating device 50B is capable of not only increasing the output of the disturbing magnetic field, but also preventing a false detection of the magnetic field by the pre-head 39, having the shutter 38 to respond well to the open/close control, and preventing a card from hitting (colliding with) the shutter 38 even when the card is quickly inserted.

[First Embodiment of Magnetic Field Generating Device]

First, the magnetic field generating device of the first embodiment is described.

Figure 6:
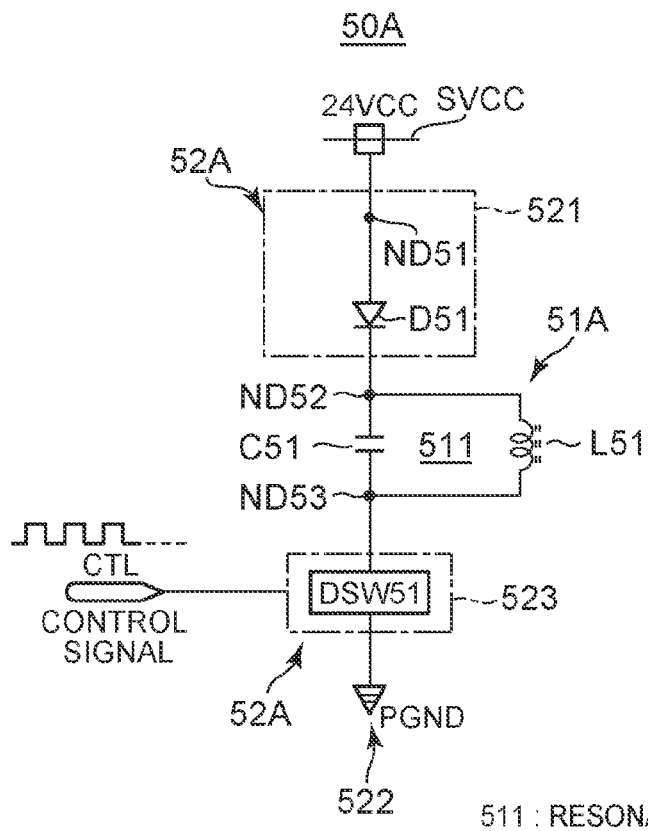
FIG. 6 A circuit diagram showing a magnetic field generating unit and a drive control circuit of the magnetic field generating device of the first embodiment of the present invention.

FIG. 6 is a circuit diagram showing the magnetic field generating unit and the drive control circuit of the magnetic field generating device of the first embodiment.

A magnetic field generating device 50A of FIG. 6 has primarily a resonance unit 511 as a magnetic field generating unit 51A, a drive power supply unit 521 as a drive control circuit 52A which supplies a drive power supply voltage VCC, a reference potential unit 522 and a resonance drive unit 523.

In this embodiment, the drive power supply voltage (hereinafter called a drive voltage) VCC supplied by the drive power supply unit 521 is set to 24V or 20V. The drive power supply unit 521 supplies the drive voltage VCC to the resonance unit 511 through a connection node ND51 which is connected to a supply source SVCC of the drive voltage VCC. A back flow preventing diode D51 is connected in the drive power supply unit 521 between the connection node ND51 and a power input node (a first node N52) of the resonance unit 511. The diode D51 is connected to be in the forward direction from the connection node N51 toward the first node ND52 of the resonance unit 511. In other words, the diode D51 is connected such that its anode is connected to the connection node ND51 and its cathode is connected to the first node ND52 of the resonance unit 511.

A reference potential unit 522 is set to a reference potential VSS. In this embodiment, the reference potential is a ground potential GND.

The resonance unit 511 includes a resonance circuit, in which an inductor L51 and a capacitor C51 are connected between the first node ND52 and a second node ND53, receives the drive voltage VCC at the first node ND 52, resonates under the condition where the second node ND53 is electrically connected to the reference potential unit 522, and generates a magnetic field corresponding to the electric current flowing in the inductor L51. In other words, the resonance unit 511 is configured to generate a disturbing magnetic field toward a skimming magnetic head to prevent illegal acquisition of magnetic data.

In this embodiment, the resonance circuit is configured by an LC parallel resonance circuit in which the inductor L51 and the capacitor C51 are connected in parallel between the first node ND52 and the second node ND53. One end of the coil, which is the inductor L51, is connected to the first node ND52 and the other end of the coil is connected to the second node ND53. One of the electrodes (the terminals) of the capacitor C51 is connected to the first node ND52 and the other electrode is connected to the second node ND53. The first node ND52 is connected to a supply line of the power supply voltage VCC of the drive power supply unit 521. The second node ND53 is selectively connected to the reference potential unit 522 via a high-power drive switching element DSW51 of the resonance drive unit 523.

In the LC parallel resonance circuit, the current from the inductor and the current from the capacitor cancel out each other, and an infinite impedance seems to be observed in the resonance frequency externally. At that time, the energy stored as an electric field inside the capacitor C51 and the energy stored as a magnetic field inside the coil which is the inductor L51 mutually move inside the system. In this embodiment, the resonance unit 511 is controlled to resonate periodically bay pulse control signal CTL via the resonance drive unit 523. Note that the pulse control signal CTL may be controlled to resonate aperiodically or may be controlled for a combination of periodic and aperiodic resonance.

As the connection between the second node ND53 and the reference potential unit 522 is switched through the resonance drive unit 523 between the connected state and the disconnected state, the resonance unit 511 is controlled such that resonance is induced and a disturbing magnetic field is generated. As a card MC is inserted to the card insertion opening 311 and the card detection sensor 372 detects the card MC, the resonance unit 511 is controlled through the resonance drive unit 523 (a magnetic field generation halt control) not to generate the disturbing magnetic field for a period longer than the above-mentioned period until the generated magnetic field loses (weakens) the function as the disturbing magnetic field or the generated magnetic field disappears. The control unit 40 judges whether or not magnetism is detected by the pre-head 39 during the pre-determined period during which the generation of the disturbing magnetic field is halted. After the resonance action is induced and the magnetic field is generated, the magnetic field attenuates its intensity following the attenuation of the resonance energy; the period mentioned here means a period in which a resonance can be induced while the attenuating magnetic field still holds the function as the disturbing magnetic field.

As the connection of the second node ND 53 in the resonance unit 511 and the reference potential unit 522 is switched between the connected state and the disconnected state according to the control signal CTL from the control unit 40, the resonance drive unit 523 is controlled to induce resonance and generate a disturbing magnetic field. As the connection of the second node ND 53 in the resonance unit 511 and the reference potential unit 522 is switched to the disconnected state periodically or/and aperiodically according to the control signal CTL from the control unit 40, the resonance drive unit 523 is controlled not to generate the disturbing magnetic field for a period longer than the above-described period, during which the generated magnetic field can no longer hold the function as the disturbing magnetic field.

The resonance drive unit 523 is configured to include a high-power drive switching element DSW51 which is composed of a bipolar transistor, for example. The drive switching element DSW51 is connected between the second node ND53 in the resonance unit 511 and the reference potential unit 522 and is to be switched between the conducting state and the non-conducting state according to the control signal CTL to switch the connection of the second node ND53 in the resonance unit 51 and the reference potential unit 522 between the connected state and the disconnected state.

When receiving the control signal CTL at the active, high level, the resonance drive unit 523 drives the drive switching element DSW51 to the conducting state. When receiving the control signal CTL at the active, low level, the resonance drive unit 523 drives the drive switching element DSW51 to the non-conducting state.

Figure 7:
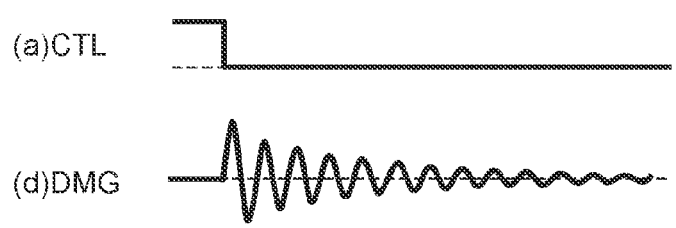
FIG. 7 Waveform to explain the operation of the magnetic field generating device of the first embodiment.

Next, the operation of the magnetic field generating device 50A of the first embodiment is described, associated with FIG. 7.

FIG. 7 shows waveforms to explain the operation of the magnetic field generating device of the first embodiment. FIG. 7 shows the waveforms resulted from a simulation where the magnetic field generating device 50A of FIG. 6 is mounted in the magnetic card reader 10 of FIG. 1. FIG. 7 (a) shows the control signal CTL; FIG. 7 (b) shows a disturbing magnetic field DMG.

Under the condition where no disturbing magnetic field is generated, the control signal CTL is supplied to the resonance drive unit 523 of the drive control circuit 52A of the magnetic field generating device 50A to generate a disturbing magnetic field, as shown in FIG. 7 (a) and FIG. 7 (b). At that time, the control signal CTL is supplied at the active, high level (H). When the resonance drive unit 523 receives the control signal CTL at the active, high level, the drive switching element DSW51 is driven to the conducting state.

By this, the second node ND53 in the resonance unit 511 becomes electrically connected to the reference potential unit 522. At the resonance unit 511, a drive voltage VCC is supplied to the first node ND52 from the drive power supply unit 521. In other words, when the connection between the second node ND53 and the reference potential unit 522 is switched to the connected state through the resonance drive unit 523, the resonance unit 511 is controlled to induce the resonance function and increase electric current flowing in the coil (the inductor) L51 to generate a disturbing magnetic field.

At this point, the control signal CTL is switched to the inactive, low level (L) and supplied to the resonance drive unit 523. When receiving the control signal CTL at the inactive, low level, the drive switching element DSW51 is driven to the non-conducting state in the resonance unit 523.

At this point, the second node ND53 in the resonance unit 511 becomes electrically disconnected from the reference potential unit 522; however, the electric current IL from the coil (the inductor) L51 still flows while attenuating in the resonance unit 511 due to the induced resonance energy, resulting in the disturbing magnetic field being attenuated but continually generated.

At this time, when the control unit 40 supplies the pulse control signal CTL, for example, to the resonance drive unit 523, the resonance action is induced at the resonance unit 511, and therefore a magnetic field is generated, but the magnetic field attenuates following the resonance energy attenuating; however, the control signal CTL is supplied to the resonance drive unit 523 at the active, high level (H) at the constant period from the previous output (supply) or/and at random so that a resonance can be induced while the attenuating magnetic field still holds the function as the disturbing magnetic field.

In other words, as shown in FIGS. 7 (*a*) and (*b*), the control signal CTL is supplied at the active, high level from the control unit 40 to the resonance drive unit 523 at the drive control circuit 52A to generate a disturbing magnetic field again, in the same manner as above. As the resonance drive unit 523 receives the control signal CTL at the active, high level, the drive switching element DSW51 is driven to the conducting state.

By this, the second node N53 at the resonance unit 511 becomes electrically connected to the reference potential unit 522. At the resonance unit 511, a drive voltage VCC is supplied to the first node ND52 from the drive power supply unit 521. In other words, when the connection between the second node ND53 and the reference potential unit 522 is switched to the connected state through the resonance drive unit 523, the resonance unit 511 is controlled to induce the resonance function again, increase electric current flowing in the coil (the inductor) L51 and generate a disturbing magnetic field.

At this point, the control signal CTL is switched to the inactive, low level (L) and supplied to the resonance drive unit 523. When receiving the control signal CTL at the inactive, low level, the drive switching element DSW51 in the resonance unit 523 is driven to the non-conducting state.

At that time, the second node ND53 in the resonance unit 511 becomes electrically disconnected from the reference potential unit 522; however, the resonance unit 511 is in the state in which the electric current IL from the coil (the inductor) L51 attenuates but still flows due to the induced resonance energy, resulting in the disturbing magnetic field being attenuated but continually generated.

The above-described operations are repeated during the period in which the disturbing magnetic field is generated.

In the above manner, in the card reader 10 in which the magnetic field generating device 50A of the first embodiment is mounted, a disturbing magnetic field is generated toward the skimming magnetic head device, which is illegally attached to the card insertion opening 311, to prevent the illegal reading of magnetic data.

In the card reader 10 in which the magnetic field generating device 50A of the first embodiment is mounted, by the way, if the disturbing magnetic field is being generated by the resonance unit (the resonance circuit) 511, the generation of the disturbing magnetic field needs to be halted when a card is detected by the card detection sensor (the card width sensor in this example) and therefore magnetism needs to be detected by the pre-head 39. For this reason, in the card reader 10 in which the magnetic field generating device 50A is mounted, the control unit 40 is configured to stop the output of the periodic or/and aperiodic control signal CTL to the resonance drive unit 523 in the drive control circuit 52A, triggered by the detection of the card by the card detection sensor 372, so that the disturbing magnetic field generation is stopped. Thus, in the card reader 10 in which the magnetic field generating device 50A is mounted, the output of the control signal CTL to generate the disturbing magnetic field is stopped, triggered by the detection of the card by the card detection sensor (the card width sensor) 372; at that time, the magnetic field tends to remain for a several ms due to the resonance. The magnetic detection is carried out by the pre-head 39 as described above, but if there is a residual magnetic field, [the pre-head] may not be able to distinguish between the magnetic data on the card and the residual disturbing magnetic field. Therefore, in the card reader 10 in which the magnetic field generating device 50A is mounted, expecting the period of time until the generated magnetic field loses its intensity to hold the function as the disturbing magnetic field or the generated magnetic field disappears, the shutter 38 is controlled not to open until this expected time passes.

For example, the pre-head 39 and the shutter 38 are spaced from each other in the card reader 10 at a distance in the card transfer direction within which the resonance energy attenuates and does not affect the magnetic head [of the card reader]. Alternatively, the output of the resonance energy may be set to attenuate. Further, the card transferring passage 32 may be configured to receive stress when transferring a card MC, so that it will take time for the card to reach the shutter 38.

In the above manner, the magnetic field generating device 50A of the first embodiment, having the LC parallel resonance circuit in which the coil L51 as the inductor and the capacitor C5 connected, generates a large magnetic field with the LC parallel resonance circuit for a predetermined period of time continuously by the retention property of the resonance energy; as a result, the output of the disturbing magnetic field can be increased and illegal acquisition of magnetic data can be prevented with certainty. In other words, even if a fraudster attaches a skimming magnetic head device (including a magnetic reading circuit) 60 to the card insertion opening 311 of the card reader 10 outside of the front panel 20 of the host device, a strong magnetic field can be generated and the output of the disturbing magnetic field can be increased to prevent illegal acquisition of magnetic data with certainty.

[Second Embodiment of Magnetic Field Generating Device]

A magnetic field generating device of the second embodiment is next described.

Figure 8:
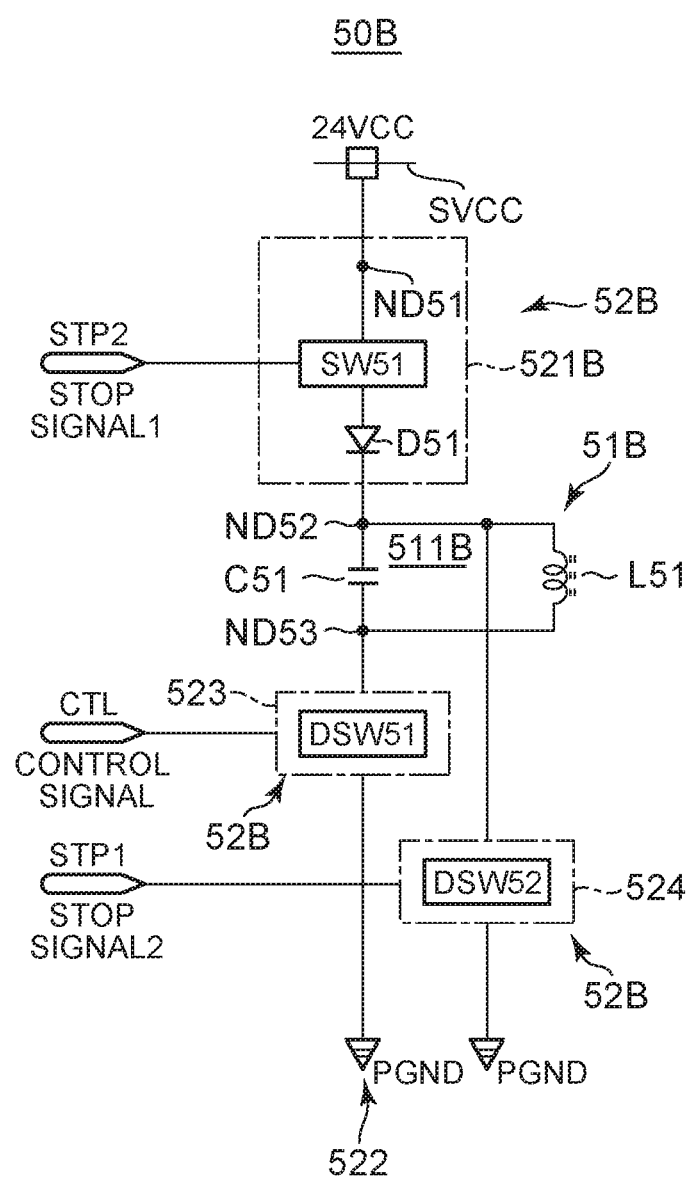
FIG. 8 A circuit diagram showing a magnetic field generating unit and a drive control circuit of the magnetic field generating device of the second embodiment of the present invention.
Figure 9:
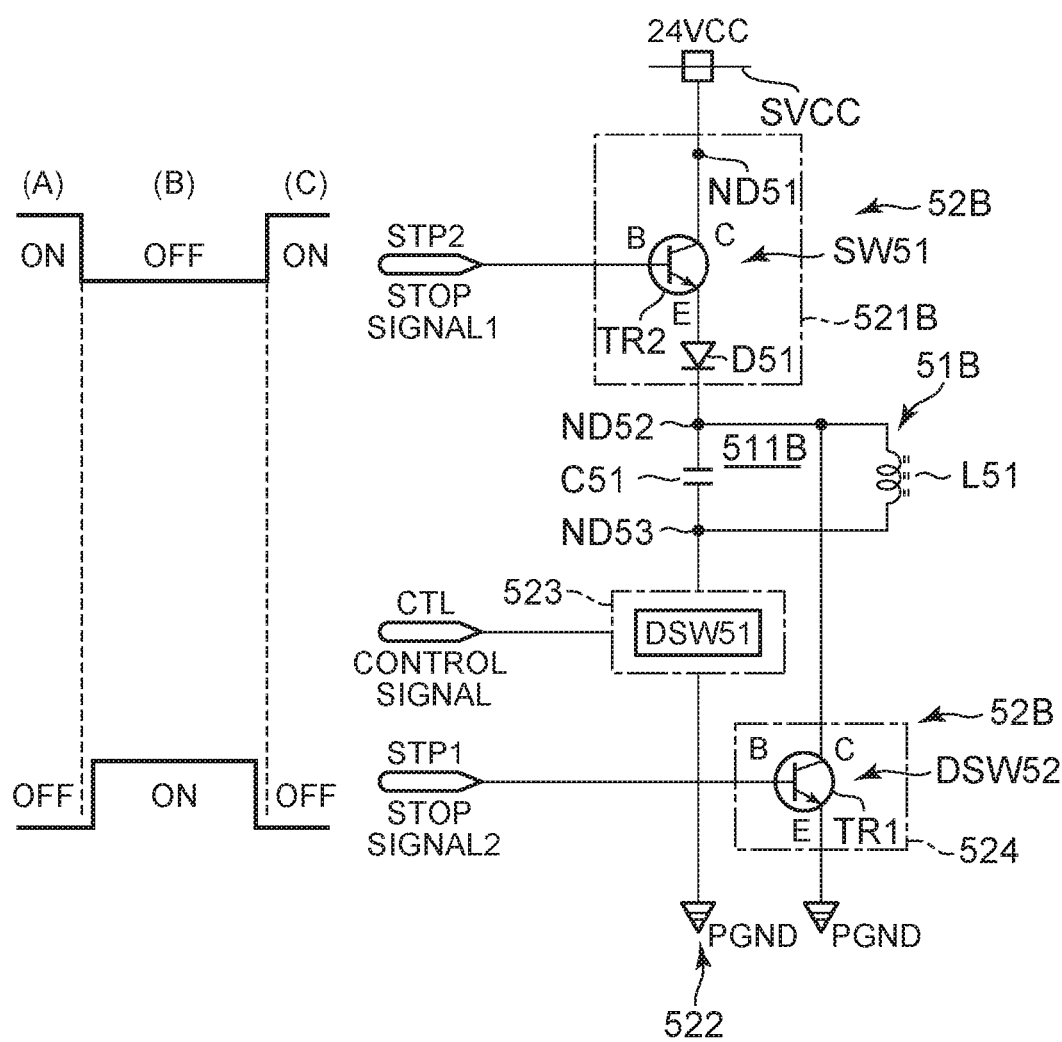
FIG. 9 A detailed circuit diagram of a major part of the drive control circuit of the second embodiment of the present invention, mainly for explaining the operation of the magnetic field generating device of the second embodiment at the time of halting the magnetic field generation.

FIG. 8 is a circuit diagram showing a magnetic field generating unit and a drive control circuit of the magnetic field generating device of the second embodiment. FIG. 9 is a circuit diagram showing more specifically a major portion of the drive control circuit of the second embodiment of the present invention, which is used to explain the operation of the magnetic field generating device of the second embodiment when the magnetic field generation is halted.

A magnetic field generating device 50B of the second embodiment differs from the magnetic field generating device 50A of the first embodiment in the following manner. The magnetic field generating device 50B of the second embodiment is configured having a function to quickly (in no time) release the resonance energy of the LC parallel resonance circuit, which generates the disturbing magnetic field of the first embodiment, when halting the generation of the disturbing magnetic field. The description below explains why this configuration is adopted.

As described above, in the card reader 10 in which the magnetic field generating device 50A is mounted, the control unit 40 is configured to stop the output of the periodic or/and aperiodic control signal CTL to the resonance drive unit 523 of the drive control circuit 52A in order to stop generating the disturbing magnetic field, triggered by the detection of the card MC by the card detection sensor 372. Thus, in the card reader 10 in which the magnetic field generating device 50A of the first embodiment is mounted, the output of the control signal CTL which is generated to generate the disturbing magnetic field is halted, triggered by the detection of the card MC by the card detection sensor (the card width sensor); however, the magnetic field tends to remain for several sm due to the resonance. Therefore, in the card reader 10 in which the magnetic field generating device 50A of the first embodiment, expecting the period of time within which the generated magnetic field loses the function to be the disturbing magnetic field or the generated magnetic field disappears, the shutter 38 is controlled not to open until this expected time passes.

However, since it tends to take longer for the shutter 38 to open in this control method, if a card is quickly inserted, the card may hit (collide with) the shutter 38. Therefore, in the magnetic field generating device 50B of the second embodiment, the first switching element DSW52 for discharge is connected to the first node ND52 in the resonance unit 511B to ensure a passage for releasing the resonance energy (a discharge passage, an escape passage). The first switching element DSW52 mentioned here is formed by a bipolar transistor which is capable of switching high power in this embodiment; however, it may be formed by other transistor such as an FET.

In the magnetic field generating device 50B of the second embodiment, a second switching element SW51 is connected to the supply line of the power supply voltage VCC of the drive power supply unit 521B to stop the supply of the power supply voltage VCC to the first node ND52 in the resonance unit 511B at the time of halting the generation of the disturbing magnetic field.

As described later, in order to stop the resonance of the resonance unit 511B and release the resonance energy, the magnetic field generating device 50B of the second embodiment is configured to switch the state of the second switching element SW51 (such as a transistor TR2) of the drive power supply unit 521B to the non-conducting state (the OFF state) to stop the supply of the drive voltage VCC, and then switch the first switching element DSW52 for discharge (such as a transistor TR1) to the conducting state (the ON state) to release the resonance energy.

Also, to resume the generation of the magnetic field, the drive control circuit 52B of the second embodiment is configured to switch the first switching element for discharge DSW52 to the non-conducting state and then to switch the second switching element SW51 to the conducting state.

A more concrete configuration of the magnetic field generating device 50B of the second embodiment is described in detail hereinafter, focusing on the addition to the configuration of FIG. 6. In the magnetic field generating device 50B, a discharge drive unit 524 is added to the drive control circuit 52B, and the configuration of the drive power supply unit 521B (see FIG. 8) is different from the drive control circuit 52A (see FIG. 6) of the first embodiment.

The discharge drive unit 524 is configured to include the transistor TR1 as the high power-corresponding first switching element DSW52 which is connected between the first node ND52 at the resonance unit 511B and a discharge potential unit, which is the reference potential unit 522, for example, and is to be switched between the conducting state and the non-conducting state according to the first magnetic field generation halt signal STP1 to switch the connection status between the first node ND52 in the resonance unit 511B and the reference potential unit 522 as the discharge potential unit between the connected state and the disconnected state. The discharge drive unit 524 forms a resonance energy release passage (a discharge passage), connecting the transistor TR1 as the first switching element for discharge DSW52 to the first node ND52 in the resonance unit 511B.

As shown in FIG. 9, the transistor TR1 as the first switching element for discharging DSW52 of the discharge driving unit 524 of this embodiment is connected between the first node ND52 in the resonance unit 511B and the discharge potential unit, which is the reference potential unit 522. The transistor TR1 is formed by an npn-type bipolar transistor, which is the first switching element DSW52 that corresponds to high power.

The transistor TR1 configuring the first switching element DSW52 is connected between the first node ND52 in the resonance unit 511B and the reference potential unit 522 and is switched between the conducting state and the non-conducting state according to the first magnetic field generation halt signal STP1 so as to switch the connection status of the first node ND52 in the resonance unit 511B and the reference potential unit 522 between the connected state and the disconnected state. The transistor TR1 is connected such that its collector (C) is connected to the first node ND52 in the resonance unit 511B, its emitter (E) is connected to the reference potential unit 522 and its base (B) is connected to the supply line of the first magnetic field generation halt signal STP1.

Receiving the first magnetic field generation halt signal STP1 at the active, high level, the discharge drive unit 524 drives the transistor TR1 which is the first switching element DSW52 to the conducting state. Receiving the first magnetic field generation halt signal STP1 at the inactive, low level, the discharge drive unit 524 drives the transistor TR1 which is the first switching element DSW52 to the non-conducting state.

The driving power supply unit 521B is configured to include the transistor TR2 which is connected between the supply source SVCC of the drive voltage VCC and the first node ND52 in the resonance unit 511B and which is to be switched between the conducting state and the non-conducting state according to the second magnetic field generation halt signal STP2 to switch the connection status between the supply source SVCC of the drive voltage and the first node ND52 of the resonance unit 511B between the connected state and the disconnected state. At the drive power supply unit 521B of the second embodiment, the supply of the drive voltage VCC to the first node ND52 of the resonance unit 511B is stopped by the second switching element SW51 at the time of halting the generation of the disturbing magnetic field.

As shown in FIG. 9, the transistor TR2 in the drive power supply unit 521B of this embodiment is connected as the second switching element SW51 between the supply source SVCC of the drive voltage VCC and the first node ND52 in the resonance unit 511B. The transistor TR2 is formed by an npn-type bipolar transistor, for example.

The transistor TR2 configuring the second switching element SW51 is connected between the connection node ND51 and the anode of the diode D51 (the first node DN52 of the resonance unit 511B further down) and is to be switched between the conducting state and the non-conducting state according to the second magnetic field generation halt signal STP2 to switch the connection status between the connection node ND51 and the first node 52 at the resonance unit 511B between the connected state and the disconnected state. The transistor TR2 is connected such that its emitter (E) is connected to the connection node ND51 (and further to the supply source VCC of the drive voltage VCC), it collector (C) with the anode of the diode D51, and its base (B) with the supply line of the second magnetic field generation halt signal.

Receiving the second magnetic field generation halt signal STP2 at the active, low level, the driving power supply unit 521B drives the transistor TR2 which is the second switching element SW51 to the non-conducting state; receiving the second magnetic field generation halt signal STP2 at the inactive, high level, it drives the transistor TR which is the second switching element SW51 to the conducting state.

The first magnetic field generation halt signal STP1 and the second magnetic field generation halt signal STP2 which are supplied to the drive control circuit 52B of the second embodiment are basically produced at complementary levels by the control unit 40. In other words, when the first magnetic field generation halt signal STP1 is set at high level, the second magnetic field generation halt signal STP2 is set at low level; when the first magnetic field generation halt signal STP1 is set at low level, the second magnetic field generation halt signal STP2 is set at high level.

In this embodiment, at the time of generating a magnetic field, which is when a disturbing magnetic field is generated toward the skimming magnetic head, the first magnetic field generation halt signal STP1 is set at low level while the second magnetic field generation halt signal STP2 is set at high level. As a result, the transistor TR1 as the first switching element DSW52 in the discharge driving unit 524 is switched to the non-conducting state while the transistor TR2 as the second switching element SW51 of the driving power supply unit 521B is switched to the conducting state.

At the time of halting the magnetic field generation, the first magnetic field generation halt signal STP1 is set to high level while the second magnetic field generation halt signal STP2 is set to low level. As a result, the transistor TR1 as the first switching element DSW52 in the discharge drive unit 524 is switched to the conducting state and the transistor TR2 as the second switching element SW51 in the drive power supply unit 521B is switched to the non-conducting state. At that time, in order to release (discharge) the resonance energy efficiently, the second magnetic field generation halt signal STP2 is set to low level and the transistor TR2 as the second switching element SW51 is switched to the non-conducting state, and then the first magnetic field generation halt signal STP1 is switched to high level and the transistor TR1 as the first switching element DSW52 is switched to the conducting state.

At the time of starting (resuming) generating the magnetic field, in order to supply power efficiently, the first magnetic field generation halt signal STP1 is set to a low level and the transistor TR1 as the first switching element DSW52 is switched to the non-conducting state, and then the second magnetic generation halt signal STP2 is switched to a high level and the transistor TR2 as the second switching element SW51 is switched to the conducting state.

The magnetic field generating device 50B having the above-described configuration can be configured in the same manner as the magnetic field generating device 50A of the above-described first embodiment. For example, as shown in FIG. 1, the magnetic field generating device 50B can be arranged to be in the vicinity to the inside (the back side) of the front panel 20. Note that the arrangement of the magnetic field generating device 50B is not limited to the one shown in FIG. 1, only the coil (inductor) L51 and the capacitor C51 may be arranged in the vicinity of the inside (the back side) of the front panel 20 and other circuit systems may be arranged at other locations, such as on the control unit 40 side.

Figure 10:
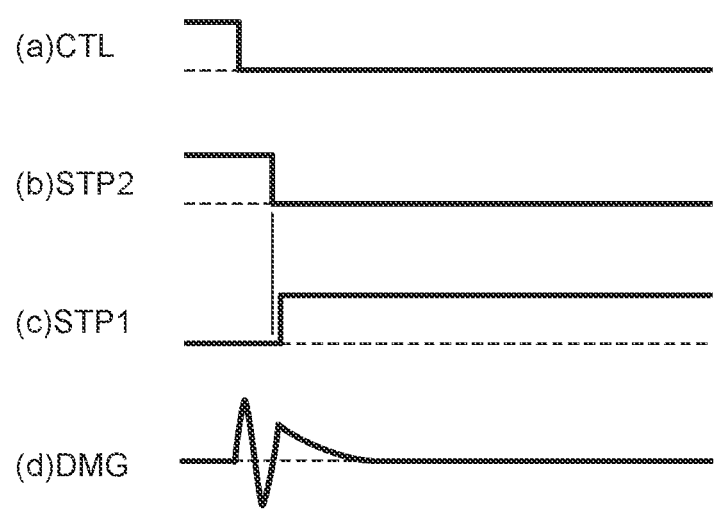
FIG. 10 Waveforms to explain the operation of the magnetic field generating device of the second embodiment.

The magnetic field generating device 50B can not only increase and continue the output of the disturbing magnetic field, but also prevent the pre-head 39 from a false detection of the magnetic field, implement the open/close control of the shutter 38 responsively, and prevent a card from hitting (colliding with) the shutter 38 even when the card is quickly inserted The operation of the magnetic field generating device 50B of the second embodiment is described next associated with FIG. 9 and FIG. 10. FIG. 9 is a diagram to explain the operation of the magnetic field generating device of the second embodiment at the time of halting the generation of the magnetic field. FIG. 10 shows waveforms to explain the operation of the magnetic field generating device of the second embodiment. FIG. 10 shows the waveforms which are the simulation results of the case in which the magnetic field generating device 50B of FIG. 8 and FIG. 9 is mounted in the card reader of FIG. 1. FIG. 10 (a) is the control signal CTL; FIG. 10 (b) is the second magnetic field generation halt signal STP2; FIG. 10 (c) is the first magnetic field generation halt signal STP1; FIG. 10 (d) is the disturbing magnetic field DMG.

Although overlapping with the description of the operation in the first embodiment, a normal operation to start a disturbing magnetic field generation is first described and then next described is an operation to halt the disturbing magnetic field generation which accompanies the resonance energy release (discharge) after the card detection.

[Operation to Generate Disturbing Magnetic Field]

When the magnetic field generating device 50B generates a magnetic field, which is when a disturbing magnetic field is generated toward a skimming magnetic head, it is necessary that no resonance energy is released (discharged), the drive voltage VCC is supplied to the first node ND52 in the resonance unit 511B, and the second node ND53 in the resonance unit 511B is connected to the reference potential unit 522.

Understanding the above, the first magnetic field generation halt signal STP1 is supplied at the inactive, low level (L) from the control unit 40 to the discharge drive unit 524 in the drive control circuit 52B so that the resonance energy won't be released (discharged), as shown by the signal waveform of FIG. 9 (A). As the discharge drive unit 524 receives the first magnetic field generation halt signal STP1 at the inactive, low level, the transistor TR1 which is the first switching element DSW52 is driven to the non-conducting state. This provides the condition where the resonance energy won't be released (discharged) from the first node ND52 in the resonance unit 511B.

At the same time, as shown by the signal waveform of FIG. 9 (A), the second magnetic field generation halt signal STP2 is supplied at the inactive, high level (H) from the control unit 40 to the drive power supply unit 521B in the drive control circuit 52B. As the drive power supply unit 521B receives the second magnetic field generation halt signal STP2 at the inactive, high level (H), the transistor TR1 which is the second switching element SW51 is driven (turned on) to the conducting state. Accompanying the transistor TR1 being turned on to the conducting state, the drive voltage VCC from the drive power supply unit 521B is supplied to the first node ND52 in the resonance unit 511B.

Under the condition where no (disturbing) magnetic field is generated, for example, the control signal CTL is supplied from the control unit 40 to the resonance drive unit 523 in the drive control circuit 52A. At that time, the control signal CTL is supplied as pulse at the active, high level (H). As the resonance drive unit 523 receives the control signal CTL at the active, high level, the drive switching element DSW51 is driven to the conducting state.

Through these operations, the second node ND53 in the resonance unit 511B becomes electrically connected to the reference potential unit 522. At the resonance unit 511B, the drive voltage VCC is supplied to the first node ND52 from the drive power supply unit 521. In other words, as the connection status between the second node ND53 and the reference potential unit 522 is changed to the connected state through the resonance drive unit 523, the resonance unit 511B is controlled to induce the resonance function, increase the current flowing in the coil (the inductor) L51, and generate a disturbing magnetic field toward the skimming magnetic head.

At this point, the control signal CTL is switched to the inactive, low level (L) and supplied to the resonance drive unit 523. When the resonance drive unit 523 receives the control signal CTL at a low inactive level, the drive switching element DSW51 is driven to the non-conducting state.

At this time, while the second node ND53 in the resonance unit 511B is electrically disconnected from the reference potential unit 522, the current from the coil (the inductor) L51 attenuates but still flows due to the induced resonance energy in the resonance unit 511B, and accordingly the disturbing magnetic field generation attenuates but continues.

At this time, as the control unit 40 supplies the pulse control signal CTL to the resonance drive unit 523, the resonance action is induced and the magnetic field is generated in the resonance unit 511B and then the magnetic field attenuates accompanying the attenuation of the resonance energy; to induce resonance while the attenuating magnetic field still retains the function as the disturbing magnetic field, the control unit 40 supplies the control signal CTL of the active, high level to the resonance drive unit 523 at a constant cycle from the previous output (supply) or/and at random.

In other words, in the same manner as the above-described embodiment, the control signal CTL is supplied at the active high level from the control unit 40 to the resonance drive unit 523 in the drive control circuit 523B, as shown in FIG. 10 (a). As the resonance drive unit 523 receives the control signal CTL at the active high level, the drive switching element DSW 51 is driven to the conducting state.

By this, the second node ND53 in the resonance unit 511B becomes electrically connected to the reference potential unit 522. The drive voltage VCC is supplied to the first node ND52 in the resonance unit 511 from the drive power supply unit 521. In other words, the resonance unit 511B is controlled such that, when the connection status between the second node ND53 and the reference potential unit 522 is switched to the connected state through the resonance drive unit 523, the resonance function is induced again, the current flowing the coil (the inductor) L51 is increased, and the disturbing magnetic field is generated.

At this point, the control signal CTL is switched to the inactive low level (L) and supplied to the resonance drive unit 523. When the resonance drive unit 523 receives the control signal CTL at the inactive low level, the drive switching element DSW51 is driven to the non-conducting state.

Although the second node ND53 in the resonance unit 511B is electrically disconnected from the reference potential unit 522 at that time, the current from the coil (the inductor) L51 attenuates but still flows in the resonance unit 511B due to the inducted resonance energy, and accordingly the generation of the disturbing magnetic field attenuates but still continues.

The operations described above are repeated during the period of generating the disturbing magnetic field.

Thus, in the card reader 10 in which the magnetic field generating device 50B of the second embodiment is mounted, the disturbing magnetic field is generated to the skimming magnetic head (including the reading circuit) which is illegally attached to the card insertion opening 311, to prevent the illegal reading of magnetic data.

[Operation of Halting the Generation of Disturbing Magnetic Field]

Described next is the operation of halting the generation of the disturbing magnetic field, including the resonance energy release (discharge) after the card detection sensor (the card width sensor in this example) detects a card. Upon receiving the signal indicating that the card detection sensor 372 has detected a card, the control unit 40 implements the drive control to quickly eliminate the highly-possibly remaining disturbing magnetic field by releasing (discharging) the resonance energy. In this case, it is necessary that the first node ND52 in the resonance unit 511B is electrically connected to the reference potential unit 522 which is the discharge potential and it is desirable that the supply of the drive voltage VCC to the first node ND52 in the resonance unit 511B be halted.

Understanding this, the second magnetic field generation halt signal STP2 is supplied at the active low level (L) from the control unit 40 to the drive power supply unit 521B at the drive control circuit 52B, as shown by the signal waveform of FIG. 9 (B), so that the supply of the drive voltage VCC to the first node ND52 in the resonance unit 511B is stopped to efficiently release the resonance energy. As the drive power supply unit 521 receives the second magnetic field generation halt signal STP2 at the active low level (L), the transistor TR2 which is the second switching element SW51 is driven (turned off) to the non-conducting state. Following the transistor TR2 being turned to the non-conducting state, the condition is established where the supply of the drive voltage VCC from the drive power supply unit 521 to the first node ND52 in the resonance unit 511B is stopped.

At the same time, as shown by the signal waveform of FIG. 9 (B), the first magnetic field generation halt signal STP1 is switched from the inactive low level (L) to the active high level (H) and supplied from the control unit 40 to the discharge drive unit 524 in the drive control circuit 52B. As the discharge drive unit 524 receives the first magnetic field generation halt signal STP1 at the active high level (H), the transistor TR1 which is the first switching element DSW52 is driven to the conducting state. By this, the first node ND52 in the resonance unit 511B becomes electrically connected to the reference potential unit 522, which allows the release (the discharge) of the resonance energy from the first node ND52 in the resonance unit 511B, and then the resonance energy in the resonance unit 511B is quickly released (discharged).

When the disturbing magnetic field is generated again after such resonance energy release is finished and the shutter 38 is opened, the same operation as the above-described operation of generating the magnetic field is implemented. Note that, in order to implement efficient switching and power supply of the operation voltage, first the first magnetic field generation halt signal STP1 is set to the low level as shown in FIGS. 9 (B) and (C) and the transistor TR1 as the first switching element DSW52 is switched to the non-conducting state, the second magnetic field generation halt signal STP2 is switched to the high level and the transistor TR1 as the second switching element SW51 is switched to the conducting state at the time of re-starting the magnetic field generation.

As described above, the magnetic field generating device 50B of the second embodiment can not only increase and continue the output of the disturbing magnetic field, but also prevent the pre-head from a false detection of a magnetic field, allow the shutter 38 to be opened/closed responsively, and prevent a card from hitting (colliding with) the shutter 38 even when the card is inserted quickly.

[Third Embodiment of Magnetic Field Generating Device]

Next, a magnetic field generating device of the third embodiment is described.

Figure 11:
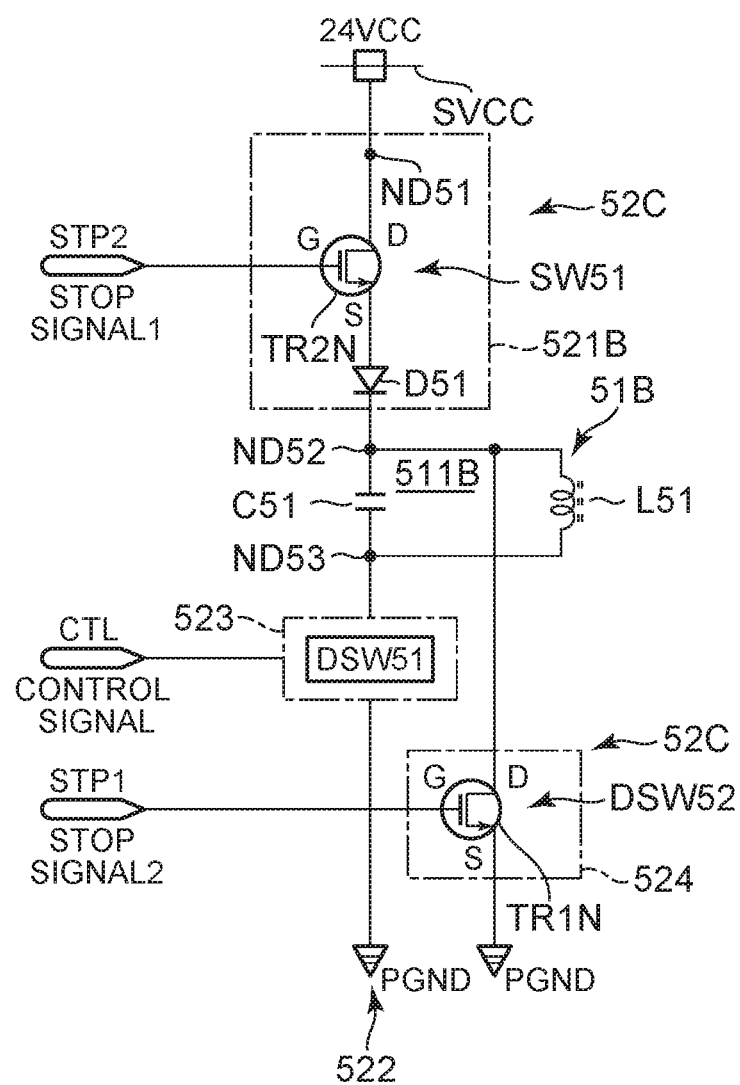
FIG. 11 A circuit diagram showing a magnetic field generating unit and a drive control circuit of the magnetic field generating device of the third embodiment of the present invention.

FIG. 11 is a circuit diagram showing a magnetic field generating unit and a drive control circuit of a magnetic field generating device of the third embodiment of the present invention.

A magnetic field generating device 50C of the third embodiment differs from the magnetic field generating device of the second embodiment shown in FIG. 9 in the following manner. At a drive control circuit 52C of the magnetic field generating device 50C, the npn-type transistor in the discharge driving unit, which is formed by a high-power bipolar transistor [in the embodiment] shown in FIG. 9, is replaced by an NMOS transistor TR1N which is an n-channel field-effect transistor FET. In the same manner, the transistor formed by the npn-type transistor at the drive control circuit 52C [in the embodiment] shown in FIG. 9 is replaced by an NMOS transistor TR2 which is an n-channel FET.

Other configurations are the same as those in the second embodiment; according to the third embodiment, the same effects as the above-described second embodiment can be obtained.

[Card Taking-in and Discharge Operations of Card Reader]

Finally, the operations of taking in and discharging a card MC by the card reader 10 are described associated with the drive timing of the magnetic field generating device 50B.

Figure 12:
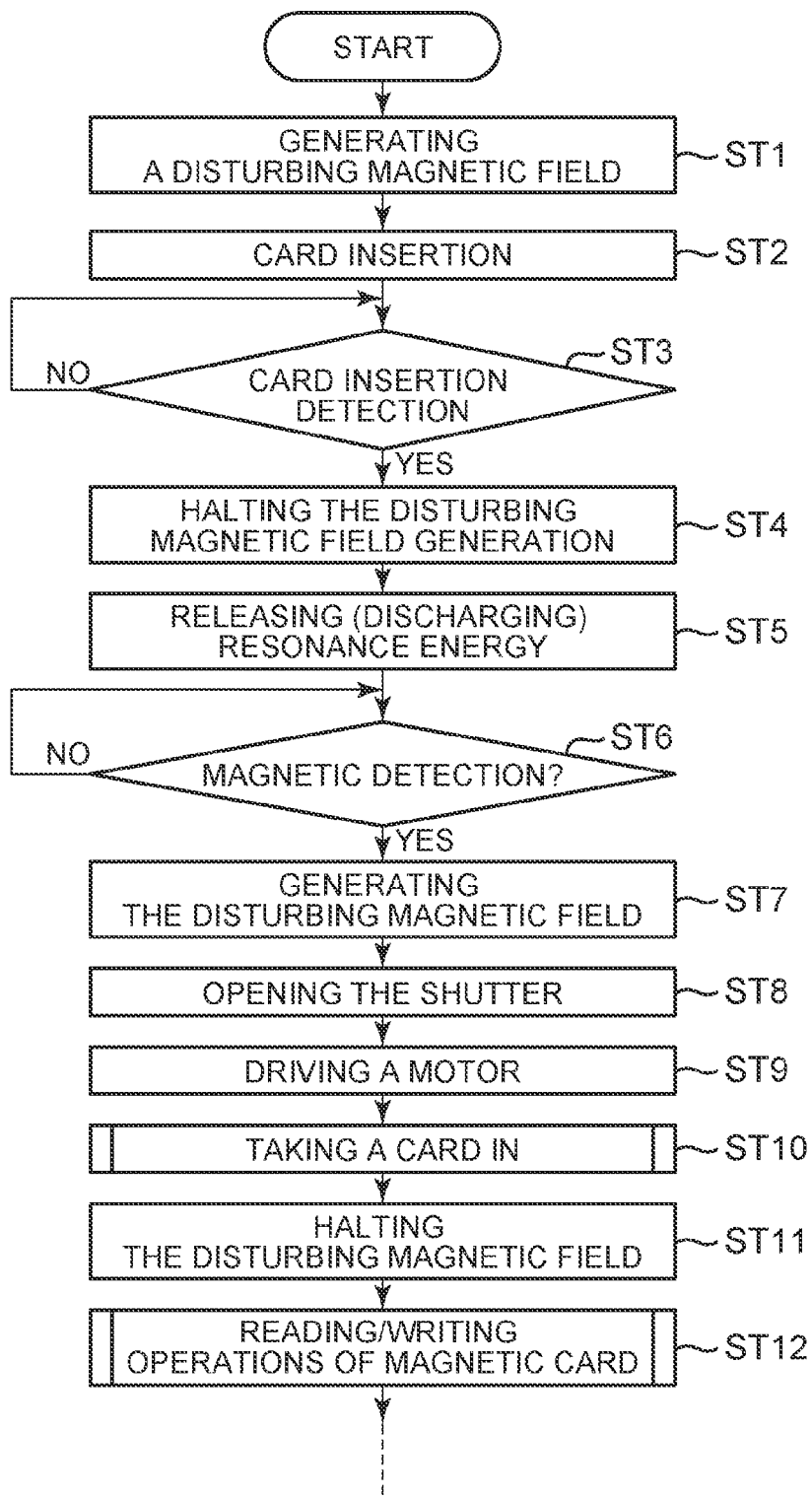
Figure 13:
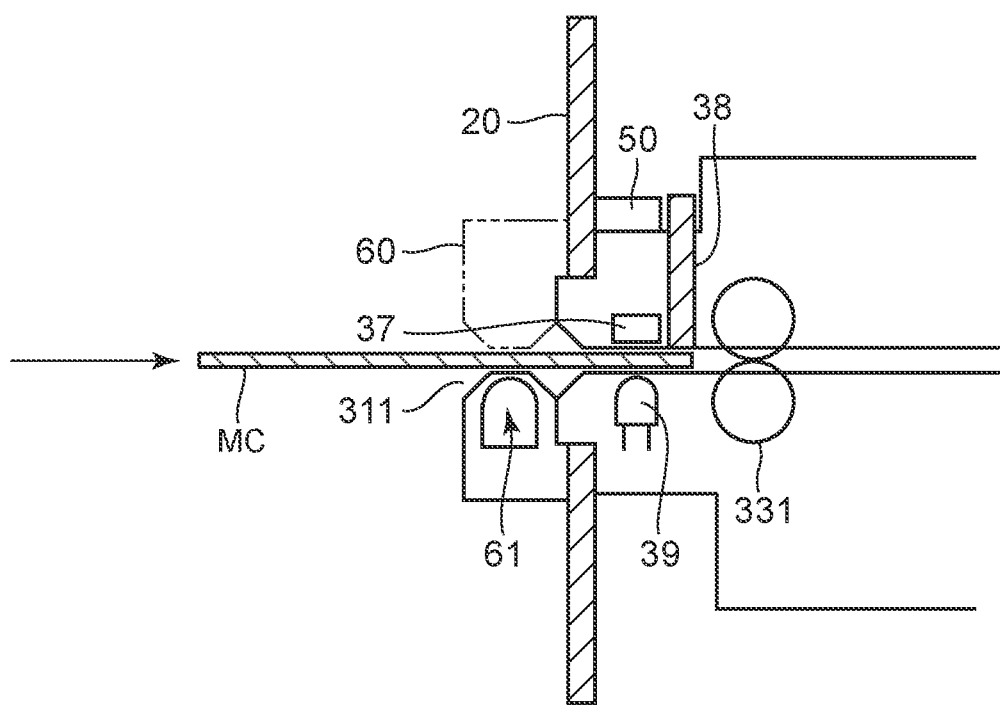

First, the operation of taking a card in is described associated with FIG. 12 and FIG. 13.

FIG. 12 is a flowchart to explain the operation of taking a card in.

FIG. 13 is a diagram to explain the operation of taking a card in.

Under the condition where the drive control circuit 52B of the magnetic field generating device 50B is driven and a disturbing magnetic field is generated to a skimming magnetic head under the control of the control unit 40 (Step ST1), when a card user insets a card MC to the card insertion opening 311 (Step ST2), the inserted card is detected by the card detection sensor 372 (Step ST3). The detection information is supplied to the control unit 40. Once the insertion of the card MC is detected, the control unit 40 drives the pre-head 39 to slide on the magnetic strip mp formed on the card MC to read magnetic data written on the magnetic strip mp. In order for the residual disturbing magnetic field not to affect magnetic detection at the moment when the pre-head 39 reads and detects magnetic data on the card MC, the control unit 40 outputs the first magnetic field generation halt signal STP1 and the second magnetic field generation halt signal STP2 at active (Step ST4 and ST5) to stop the generation of the magnetic field and to release (discharge) the resonance energy in the resonance unit 511B of the drive control circuit 52B. Under this condition, the magnetic strip on the inserted card MC is detected by the card insertion-detecting pre-head 39 (Step ST6). With the detection signal by the pre-head 39, the control unit 40 drives the drive control circuit 52B in the magnetic field generating device 50B for a predetermined period of time to generate a disturbing magnetic field (Step ST7). Under the condition where the disturbing magnetic field is generated, the control unit 40 drives the shutter 38 to open (Step ST8), drives the drive motor 38 (Step ST9) and drives the transfer system including a pair of take-in rollers 331.

As a result, the card MC can be taken inside. When the card MC is inserted deeper passing the position of the shutter 38, the leading edge of the card is held fast by the take-in/discharge rollers 331 and the operation of taking the card MC in starts (Step ST10).

In this embodiment, after the taking the card MC inside has started, the disturbing magnetic field is being generated by the magnetic field generating device 50B while the rear edge of the card MC is sticking out of the card insertion opening 311, and then the generation of the disturbing magnetic field is stopped (Step ST11). The period of time in which the disturbing magnetic field is generated can be managed with the passing time from the point of the detection by the card insertion detecting pre-head 39 or by the card detection sensor 37.

After taking the card MC inside up to the position of the reading magnetic head 31, the magnetic head 34 reads from or writes on the card MC (Step ST12).

During the operation of taking-in the card MC in this embodiment, the disturbing magnetic field is generated when the rear edge of the card MC is [still] sticking out of the card insertion opening 311. Consequently, as shown by an imaginary line in FIG. 13, for example, even if a skimming magnetic head device 61 is attached to a location outside the card insertion opening 31, that is to the front surface of the front panel 20 of a host device, the skimming magnetic head 61 cannot completely read magnetic data on the inserted card MC due to the generated disturbing magnetic field. Therefore, illegal reading of magnetic data by such a skimming magnetic head 61 can be prevented.

The discharge operation is described next associated with FIG. 14 and FIG. 15.

Figure 14:
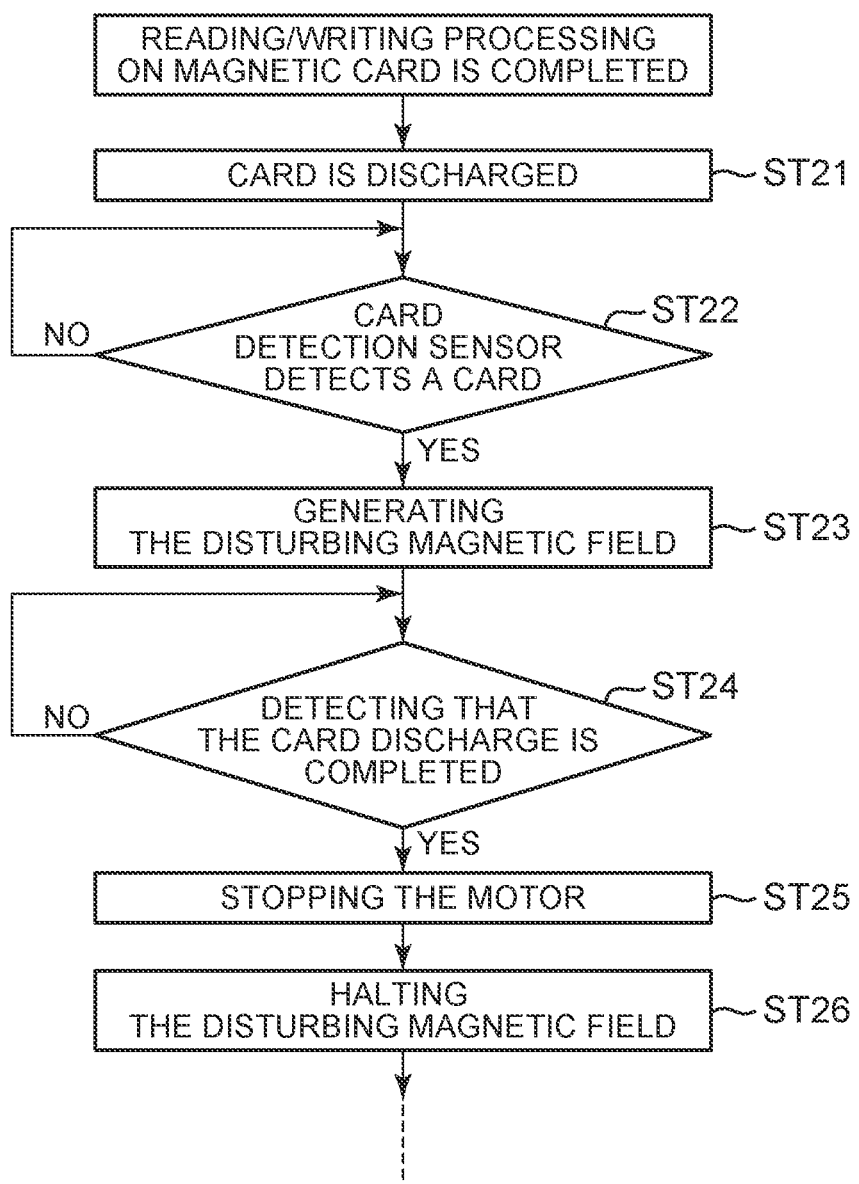
FIG. 14 A flowchart to explain the operation [of the magnetic recording medium processing device] when discharging a card.

FIG. 14 is a flowchart to explain the operation of discharging the card.

Figure 15:
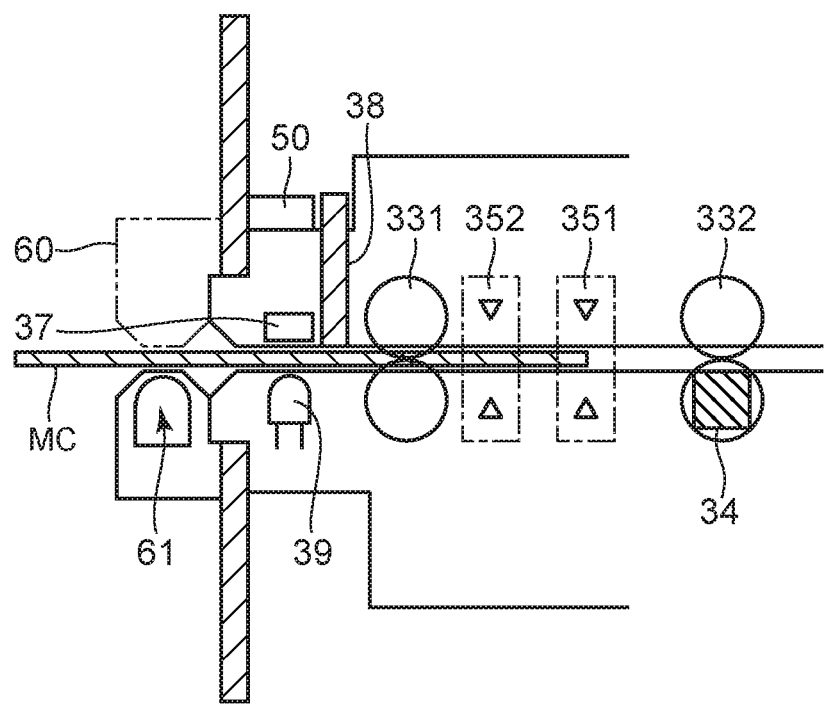
FIG. 15 A diagram to explain the operation of the magnetic recording medium processing device when discharging a card.

FIG. 15 is a diagram to explain the operation of discharging the card.

When the operation of discharging the card MC by rollers 311, 332 and 333 starts (Step ST21) and the leading edge of the discharging card MC in the discharging direction is detected by the card detection sensor 37 (Step ST22), the magnetic field generating device 50B is driven and the disturbing magnetic field is generated (Step ST23).

As the rear edge of the discharging card MC is detected by the photo sensor 352 (Step ST24), the drive motor 36 is stopped (Step ST25) to end the card discharging operation. Then, the control unit 40 stops driving the drive control circuit 52B in the magnetic field generating device 50 to stop generating the disturbing magnetic field (Step ST26).

At the end of the card discharging operation, the rear edge of the card MC is still held fast by the transfer rollers 331. Aa a user pulls the card MC out lightly, the card MC can be taken out of the card insertion opening 311. Note that, when a user forgets to take the card MC out, the transfer rollers 36 are driven after a predetermined time passes to collect the card MC to the inside.

Thus, in the card reader 10 of this embodiment, even at the time of discharging the card, the disturbing magnetic field is temporarily generated while the rear edge of the card on the discharge side is sticking out from the card insertion opening 311. Therefore, even if the skimming magnetic head 61 is attached to the front surface of the front panel, the skimming magnetic head 61 is prevented from reading magnetic data on the card MC to be discharged.

Note that although this embodiment is an example in which the magnetic field generating device 50B is driven only once for a predetermined period in which the card is inserted and discharged, the device 50B can be driven two or more times intermittently.

Effects of the Embodiment

As described above, the following effects can be obtained in this embodiment.

In this embodiment, [the magnetic field generating device] has the LC parallel resonance circuit in which the coil L as the inductor and the capacitor C are connected, and generates a strong magnetic field by the LC parallel resonance circuit for a predetermined period of time continually through the retention property of the resonance energy; as a result, the output of the disturbing magnetic field is increased to prevent illegal acquisition of magnetic data with certainty. In other words, even if a fraudster has attached the so-called "skimming" magnetic head device (a skimmer) 60 including the skimming magnetic head and magnetic reading circuit to a location outside the front panel, which is the card insertion opening of the card reader, to read magnetic data on cards, a strong magnetic field can be generated and the output of the disturbing magnetic field can be increased to prevent illegal acquisition of magnetic data with certainty.

According to this embodiment, in the magnetic field generating device 50B, the transistor TR1 as the first switching element DSW52 for discharging [resonance energy] is connected with the first node ND52 in the resonance unit 511B to ensure a release passage (a discharge passage, an escape) of the resonance energy. Also, in the magnetic field generating device 50B, the transistor TR2 as the second switching element SW51 is connected to the supply line of the power supply voltage VCC of the driving power supply unit 521B to the resonance unit 511B to stop the supply of the power supply voltage VCC to the first node ND52 in the resonance unit 511B while the disturbing magnetic file generation is halted. As a result, according to this embodiment, not only can the output of the disturbing magnetic field be increased and continued, but also a false detection of a magnetic field by the pre-head 39 can be prevented, the shutter can be opened/closed responsively, and a card is prevented from hitting (colliding with) the shutter even when the card is quickly inserted.

For stopping the resonance at the resonance unit 511B and releasing the resonance energy, the magnetic field generating device 50B is configured to switch the transistor TR2 as the second switching element SW51 in the drive power supply unit 521B to the non-conducting state (the OFF state) to stop the supply of the drive voltage VCC and then to switch the transistor TR1 as the first switching element DSW52 for discharging [resonance energy] to the conducting state to release the resonance energy. Consequently, the resonance energy can efficiently be released (discharged).

The magnetic field generating device 50B of the second embodiment is configured to switch the transistor TR1 as the first switching element DSW52 for discharging [resonance energy] to the non-conducting state and then to switch the transistor TR2 as the second switching element SW55 to the conducting state at the start (re-start) of generating the magnetic field. Consequently, the resonance energy can efficiently be released (discharged).

According to the magnetic field generating device of this embodiment, even if a fraudster has attached the so-called "skimmer" which includes the skimming magnetic head and the magnetic reading circuit at a location outside the front panel, which is at the card insertion opening of a card reader, to read magnetic data on cards, a [disturbing] magnetic field can be generated and the output of the disturbing magnetic field is increased and continued to prevent illegal acquisition of magnetic data with certainty. Also, in this embodiment, the timing of generating the disturbing magnetic field is at the time of card insertion and card discharge; therefore, the operations by the recording/reproducing magnetic head inside the card reader won't be disturbed even without providing a magnetic shield plate.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetic recording medium processing device for use with a magnetic recording medium comprising a magnetic strip, the magnetic recording medium processing device comprising:

a detection mechanism structured to detect the magnetic recording medium when inserted into or discharged from an insertion opening;

a pre-head structured to slide on the magnetic strip formed on said magnetic recording medium to read magnetic data;

a shutter structured to open and close in response to the detection result of said detection mechanism;

a card processor structured to process magnetic information recorded on said magnetic recording medium; and a magnetic field generating device comprising:
a magnetic field generator structured to generate a magnetic field by a resonance unit; and
a drive control circuit structured to control driving of said magnetic field generator;

wherein said drive control circuit comprises:
a drive power supply structured to supply a drive voltage,
a reference potential circuit; and
a resonance drive circuit structured to drive said resonance unit;

said resonance unit comprises a resonance circuit in which an inductor and a capacitor are connected between a first node and a second node, and said resonance unit is structured to receive said drive voltage at said first node, and resonate, while said second node is connected to said reference potential circuit, to generate a magnetic field; and said resonance drive unit comprises a drive switch element which is connected between said second node at said resonance unit and said reference potential circuit and is switchable between a conducting state and a non-conducting state depending on the control signal to switch the connection status of said second node at said resonance unit and said reference potential circuit between a connected state and a disconnected state.

2. The magnetic recording medium processing device as set forth in claim 1, wherein said drive control circuit comprises a discharge drive circuit comprising a first switch element which is connected between said first node at said resonance unit and a discharge potential circuit and is switchable between a conducting state and a non-conducting state according to a magnetic field generation halt signal to switch the connection status of said first node at said resonance unit and said discharge potential circuit between a connected state and a non-connected state; and said first switch element is switched to the conducting state at the time of halting the generation of said magnetic field.

3. The magnetic recording medium processing device as set forth in claim 1, wherein said drive control circuit is connected between said first node at said resonance unit and a discharge potential circuit and comprises a discharge drive circuit comprising a first switch element which is switchable between a conducting state and a non-conducting state in response to a first magnetic field generation halt signal and switches the connection status of said first node at said resonance unit and said discharge potential circuit between a connected state and a disconnected state;

said drive power supply comprises a second switch element which is connected between a supply unit of said drive voltage and said first node and is switchable between a conducting state and a non-conducting state according to a second magnetic field generation halt signal to switch the connection status between said supply unit of said drive voltage and said first node at said resonance unit between a connected state and a disconnected state.

4. The magnetic field generating device as set forth in claim 3, wherein the drive control circuit is structured such that, at the time of halting the generation of the magnetic field, said drive control circuit first switches said second switch element to the nonconducting state and then switches said first switch element at said discharge drive unit to the conducting state.

5. The magnetic recording medium processing device as set forth in claim 3, wherein the drive control circuit is structured such that, at the time of starting the magnetic field generation, said drive control circuit first switches said first switch element at said discharge driving unit to the non-conducting state and then switches said second switch element at said driving power supply unit.

6. The magnetic recording medium processing device as set forth in claim 1, wherein said resonance drive circuit is structured to drive said resonance unit by switching the connection status of said second node at said resonance unit and said reference potential unit periodically or aperiodically between the disconnected state and the connected state, to induce a resonance periodically or aperiodically, and to generate a magnetic field periodically or aperiodically.

7. The magnetic recording medium processing device as set forth in claim 1, further comprising:

a controller for structured to control said magnetic field generating device in response to the detection result by said detection mechanism and the detection information by said pre-head;

wherein said controller is structured to stop the magnetic field generation by said magnetic field generating device when a recording medium is detected by said detection mechanism, and starts the magnetic field generation by said magnetic field generating device after magnetic information is detected by said pre-head.

8. The magnetic recording medium processing device as set forth in claim 7, wherein said controller is structured such that, after magnetic information is detected by said pre-head and the magnetic field generation by said magnetic field generating device is started, said control unit opens said shutter to take said magnetic recording medium.

9. A control method for a magnetic recording medium processing device for use with a magnetic recording medium comprising a magnetic strip, the magnetic recording medium processing device comprising a detection mechanism structured to detect the magnetic recording medium which is inserted into or discharged from an insertion opening, a pre-head structured to slide on the magnetic strip formed on said magnetic recording medium to read magnetic data, a shutter structured to open and close in response to the detection result of said detection mechanism, a card processor structured to process magnetic information recorded on said magnetic recording medium, and a magnetic field generating device comprising a magnetic field generator structured to generate a magnetic field with a resonance unit which comprises a resonance circuit, in which an inductor and a capacitor are connected between a first node and a second node, and a drive control circuit structured to control driving of said magnetic field generating unit, wherein said drive control circuit of said magnetic generating device comprises a drive power supply structured to supply a drive voltage, a reference potential circuit, a resonance drive circuit comprising a drive switch element which is connected between said second node at said resonance unit and said reference potential circuit, and is switchable between the conducting state and the non-conducting state in response to a control signal to switch the connection status of said second node at said resonance unit and said reference potential circuit between a connected state and a disconnected state, and a discharge drive unit comprising a first switch element which is connected between said first node at said resonance unit and a discharge potential circuit and is switchable between the conducting state and the non-conducting state in response to a magnetic field generation halt signal to switch the connection status of said first node at said resonance unit and said discharge potential circuit between the connected state and the disconnected state; said control method comprising:

switching said first switch element to the conducting state at the time of halting the magnetic field generation when controlling the magnetic field generation halt at said magnetic recording medium processing device.

10. The control method for a magnetic recording medium processing device as set forth in claim 9, wherein said drive power supply comprises a second switch element which is connected between a supply unit of said drive voltage and said first node at said resonance unit and is switchable between a conducting state and a non-conducting state according to a second magnetic field generation halt signal to switch the connection status of said supply unit of said drive voltage and said first node at said resonance unit between the connected state and the disconnected state;

when controlling the magnetic field generation halt in said magnetic recording medium processing device, said first switch element at said discharge driveunit is switched to the non-conducting state and said second switch element at said drive power supply is switched to the conducting state at the time of generating a magnetic field, and said first switch element at said discharge driveunit is switched to the conducting state and said second switch element at said drive power supply is switched to the non-conducting state at the time of halting the magnetic field generation.

11. The control method for a magnetic recording medium processing device as set forth in claim 10, wherein, at the time of halting the magnetic field generation, said second switch element at said drive power supply is switched to the non-conducting state and then said first switch element at said discharge driveunit is switched to the conducting state.

12. The control method for a magnetic recording medium processing device as set forth in claim 10, wherein, at the time of starting the magnetic field generation, said first switch element at said discharge driveunit is switched to the non-conducting state and then said second switch element at said drive power supply is switched to the conducting state.

13. The control method for a magnetic recording medium processing device as set forth in claim 9, wherein
said magnetic field generating device is driven according to the detection result by said detection mechanism and the detection information by said pre-head; and
said resonance unit is driven so that, by periodically or aperiodically switching the connection status of said second node at said resonance unit and said reference potential circuit between the connected state and the disconnected state, a resonance is induced periodically or aperiodically and a magnetic field is periodically or aperiodically generated.

14. The control method for a magnetic recording medium processing device as set forth in claim 9, further comprising drive-controlling said magnetic field generating device according to the detection result by said detection mechanism and the detection information by said pre-head, and
when drive-controlling sad magnetic field generating device, halting the magnetic field generation by said magnetic field generating device as soon as a recording medium is detected by said detection mechanism and starting the magnetic field generation by said magnetic field generating device after magnetic information is detected by said pre-head.

15. The control method for a magnetic recording medium processing device as set forth in claim 14, wherein after magnetic information is detected by said pre-head and a magnetic field generation by said magnetic field generating device is started, said shutter is opened to take said magnetic recording medium.

* * * * *